United States Patent
Heo et al.

(10) Patent No.: US 9,215,058 B2
(45) Date of Patent: Dec. 15, 2015

(54) ENHANCED PHICH TRANSMISSION FOR LTE-ADVANCED

(75) Inventors: Youn Hyoung Heo, Hwassung-si (KR); Shiwei Gao, Nepean (CA); Hua Xu, Ottawa (CA); Yufei Wu Blankenship, Kildeer, IL (US); Yongkang Jia, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 288 days.

(21) Appl. No.: 13/545,525

(22) Filed: Jul. 10, 2012

(65) Prior Publication Data
US 2013/0235812 A1 Sep. 12, 2013

Related U.S. Application Data

(60) Provisional application No. 61/607,436, filed on Mar. 6, 2012.

(51) Int. Cl.
*H04W 4/00* (2009.01)
*H04L 5/00* (2006.01)
(Continued)

(52) U.S. Cl.
CPC ............ *H04L 5/0094* (2013.01); *H04L 1/0038* (2013.01); *H04L 1/1829* (2013.01);
(Continued)

(58) Field of Classification Search
CPC . H04W 72/00; H04W 72/04; H04W 72/0453; H04W 72/042; H04W 72/0406; H04W 72/0446; H04W 72/1278; H04W 72/189; H04W 36/0072; H04W 36/0083; H04W 36/06; H04W 36/30; H04L 5/0053; H04L 5/0007

USPC ........ 370/203–208, 312, 329–330, 335–336, 370/342–345; 375/260; 455/101, 455/422.1–425, 450, 17, 500, 509
See application file for complete search history.

(56) References Cited

U.S. PATENT DOCUMENTS

| | | |
|---|---|---|
| 2009/0088148 A1 | 4/2009 | Chung et al. |
| 2009/0168922 A1 | 7/2009 | Malladi et al. |

(Continued)

FOREIGN PATENT DOCUMENTS

| | | |
|---|---|---|
| CN | 102123014 A | 7/2011 |
| EP | 2037616 A2 | 3/2009 |

(Continued)

OTHER PUBLICATIONS

Blankenship, Yufei Wu, et al.; U.S. Appl. No. 13/545,548, filed Jul. 10, 2012; Title: Enhanced Common Downlink Control Channels.

(Continued)

*Primary Examiner* — Thai Hoang
(74) *Attorney, Agent, or Firm* — Conley Rose, P.C.; J. Robert Brown, Jr.

(57) ABSTRACT

A method is provided for communication in a wireless telecommunication system. The method comprises generating a sequence of signals of an enhanced physical HARQ (hybrid automatic repeat request) indicator channel (E-PHICH). The method further comprises mapping the sequence of signals of the E-PHICH to a first set of resource elements, wherein the first set of resource elements is multiplexed with a second set of resource elements over a set of virtual resource blocks, and wherein the second set of resource elements carries at least one of an enhanced physical downlink control channel (E-PDCCH) and a physical downlink shared channel (PDSCH).

43 Claims, 12 Drawing Sheets

(51) Int. Cl.
*H04L 1/00* (2006.01)
*H04L 1/18* (2006.01)

(52) U.S. Cl.
CPC ............ *H04L1/1858* (2013.01); *H04L 5/0037* (2013.01); *H04L 5/0053* (2013.01); *H04L 5/001* (2013.01); *H04L 5/0023* (2013.01); *H04L 5/0035* (2013.01)

(56) References Cited

U.S. PATENT DOCUMENTS

| | | | |
|---|---|---|---|
| 2009/0209247 A1 | 8/2009 | Lee et al. | |
| 2009/0238091 A1 | 9/2009 | Kim et al. | |
| 2009/0245187 A1 | 10/2009 | Nam et al. | |
| 2009/0298493 A1 | 12/2009 | Lin | |
| 2010/0159935 A1 | 6/2010 | Cai et al. | |
| 2010/0172308 A1 | 7/2010 | Nam et al. | |
| 2010/0195583 A1 | 8/2010 | Nory et al. | |
| 2010/0322154 A1 | 12/2010 | Chen et al. | |
| 2011/0034175 A1 | 2/2011 | Fong et al. | |
| 2011/0070845 A1 | 3/2011 | Chen et al. | |
| 2011/0075624 A1 | 3/2011 | Papasakellariou et al. | |
| 2011/0103292 A1 | 5/2011 | Pasad et al. | |
| 2011/0103296 A1 | 5/2011 | Ji et al. | |
| 2011/0149903 A1 | 6/2011 | Krishnamurthy et al. | |
| 2011/0170496 A1 | 7/2011 | Fong et al. | |
| 2011/0205948 A1 | 8/2011 | Chen et al. | |
| 2011/0206014 A1 | 8/2011 | Lee et al. | |
| 2011/0255485 A1 | 10/2011 | Chen et al. | |
| 2011/0274066 A1 | 11/2011 | Tee et al. | |
| 2012/0021756 A1 | 1/2012 | Kwon et al. | |
| 2012/0044896 A1 | 2/2012 | Kwon et al. | |
| 2012/0120868 A1 | 5/2012 | Park et al. | |
| 2013/0039284 A1* | 2/2013 | Marinier et al. | 370/329 |
| 2013/0039291 A1 | 2/2013 | Blankenship et al. | |
| 2013/0083666 A1* | 4/2013 | Gaal | 370/241 |
| 2013/0083750 A1* | 4/2013 | Nazar et al. | 370/329 |
| 2013/0114529 A1* | 5/2013 | Chen et al. | 370/329 |
| 2013/0155974 A1* | 6/2013 | Papasakellariou et al. | 370/329 |
| 2013/0194931 A1* | 8/2013 | Lee et al. | 370/241 |
| 2013/0195020 A1 | 8/2013 | Frederiksen et al. | |
| 2013/0201926 A1* | 8/2013 | Nam et al. | 370/329 |
| 2013/0215842 A1* | 8/2013 | Han et al. | 370/329 |

FOREIGN PATENT DOCUMENTS

| | | |
|---|---|---|
| EP | 2104294 A2 | 9/2009 |
| EP | 2421187 A2 | 2/2012 |
| WO | 2011032035 A2 | 3/2011 |
| WO | 2011099722 A3 | 8/2011 |
| WO | 2011137383 A1 | 11/2011 |

OTHER PUBLICATIONS

Vrzic, Sophie, et al.; U.S. Appl. No. 13/626,595, filed Sep. 25, 2012; Title: E-PDCCH Design for Reducing Blind Decoding.
3GPP TS 36.211 V10.1.0; 3rd Generation Partnership Project; Technical Specification Group Radio Access Network; Evolved Universal Terrestrial Radio Access (E-UTRA); Physical Channels and Modulation; Release 10; Mar. 2011; 103 pages.
3GPP TS 36.211 V10.2.0; 3rd Generation Partnership Project; Technical Specification Group Radio Access Network; Evolved Universal Terrestrial Radio Access (E-UTRA); Physical Channels and Modulation; Release 10; Jun. 2011; 103 pages.
3GPP TS 36.212 V10.1.0; 3rd Generation Partnership Project; Technical Specification Group Radio Access Network; Evolved Universal Terrestrial Radio Access (E-UTRA); Multiplexing and Channel Coding; Release 10; Mar. 2011; 76 pages.
3GPP TS 36.212 V10.2.0; 3rd Generation Partnership Project; Technical Specification Group Radio Access Network; Evolved Universal Terrestrial Radio Access (E-UTRA); Multiplexing and Channel Coding; Release 10; Jun. 2-11; 78 pages.
3GPP TS 36.213 V10.1.0; 3rd Generation Partnership Project; Technical Specidicatoin Group Radio Access Network; Evolved Universal Terrestrial Radio Access (E-UTRA); Physical Layer Procedures; Release 10; Mar. 2011; 115 pages.
3GPP TS 36.23 V10.2.0; 3rd Generation Partnership Project; Technical Specification Group Radio Access Network; Evolved Universal Terrestrial Radio Access (E-UTRA); Physical Layer Procedures; Release 10; Jun. 2011; 120 pages.
3GPP TS 36.331 V10.1.0; 3rd Generation Partnership Project; Technical Specification Group Radio Access Network; Evolved Universal Terrestrial Radio Access (E-UTRA); Radio Resource Control (RRC); Protocol Specification; Releas 10; Mar. 2011; 290 pages.
3GPP TSG RAN WG1 Meeting #67; "Aspects on DL and UL Control Channels for HARQ with Enhanced PDCCH"; R1-113921; San Francisco, USA; Nov. 10-14, 2011; 4 pages.
3GPP TSG-RAN WG1 #67; "Search Space for Enhanced Control Channels"; R1-113680; San Francisco; Nov. 14-18, 2011; 2 pages.
3GPP TSG RAN WG1 #67; "E-PDCCH Design Aspects"; R1-114029; San Francisco, USA; Nov. 14-18, 2011; 4 pages.
3GPP TSG-RAN WG1 #67; "Views on Enhanced PHICH"; R1-113682; San Francisco; Nov. 14-18, 2011; 1 page.
3GPP TSG RAN WG1 Meeting #67; "PHICH Enhancements"; R1-114067; San Francisco, USA; Nov. 14-18, 2011; 3 pages.
Notice of Allowance dated Sep. 19, 2013; U.S. Appl. No. 13/626,595, filed Sep. 25, 2012; 16 pages.
Office Action dated Feb. 27, 2013; U.S. Appl. No. 13/626,595, filed Sep. 25, 2012; 21 pages.
PCT International Search Report; Application No. PCT/US2013/021428; Apr. 30, 2013; 3 pages.
PCT Written Opinion of the International Searching Authority; Application No. PCT/US2013/021428; Apr. 30, 2013; 4 pages.
Lindbom, Lars, et al.; "Enhanced Inter-Cell Interference Coordination for Heterogeneous Networks in LTE-Advanced: A Survey"; Dec. 7, 2011; 18 pages.
PCT International Search Report; Application No. PCT/US2013/029135; May 23, 2013; 3 pages.
PCT Written Opinion of the International Searching Authority; Application No. PCT/US2013/029135; May 23, 2013; 11 pages.
PCT International Search Report; Application No. PCT/US2013/032972; Jun. 6, 2013; 2 pages.
PCT Written Opinion of the International Searching Authority; Application No. PCT/US2013/032972; Jun. 6, 2013; 15 pages.
Office Action dated Mar. 6, 2014; U.S. Appl. No. 13/545,548, filed Jul. 10, 2012; 25 pages.
PCT International Preliminary Report on Patentability; Application No. PCT/US2013/021428; Apr. 16, 2014; 15 pages.
Final Office Action dated Aug. 15, 2014; U.S. Appl. No. 13/545,548 filed Jul. 10, 2012; 15 pages.
Office Action dated Novemer 17, 2014; U.S. Appl. No. 13/545,548 filed Jul. 10, 2012; 14 pages.
3GPP TSG RAN WG1 Meeting #67; "E-PDCCH Multiplexing and Link Level Evaluations"; R1-113744; San Francisco, USA; Nov. 14-18, 2011; 5 pages.
3GPP TSG RAN WG1 Meeting #67; "On the Structure and Usage Scenarios of ePDCCH"; R1-114300; San Francisco, USA; Nov. 14-18, 2011; 9 pages.
Final Office Action dated Apr. 23, 2015; U.S. Appl. No. 13/545,548, filed Jul. 10, 2012; 21 pages.
European Extended Search Report; Application No. 13738977.1; Mar. 20, 2015; 10 pages.
Taiwanese Office Action; Application No. 102109723; Jan. 29, 2015; 28 pages.
Notice of Allowance dated Jul. 16, 2015; U.S. Appl. No. 13/545,548 filed Jul. 10, 2012; 9 pages.
Blankenship, Yufei Wu, et al.; U.S. Appl. No. 14/925,425; Filing Date: Oct. 28, 2015; Title: Enhanced Common Downlink Control Channels; 80 pages.
European Extended Search Report; Application No. 13757275.6; Oct. 29, 2015; 8 pages.

* cited by examiner

| PDCCH format | Number of CCEs | Number of resource-element groups | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

Table 1: Supported PDCCH formats in LTE

| System BW | # of PHICH groups | # of REGs for PHICH | # of REs |
|---|---|---|---|
| 20MHz | 25 | 75 | 300 |
| 10MHz | 13 | 39 | 156 |
| 5MHz | 7 | 21 | 84 |

Table 2: Maximum PHICH resource in Rel-8

| # of symbols available for PDSCH | # of CRS ports | # of REs per PRB pair |
|---|---|---|
| 13 | 4 | 136 |
| 12 | 4 | 128 |
| 11 | 4 | 116 |
| 10 | 4 | 104 |

Table 3: Number of REs per PRB pair in a subframe available for PDSCH data transmission

| System bandwidth | 5 MHz | 10 MHz | 20 MHz |
|---|---|---|---|
| Number of VRB pair | 1 | 1-2 | 2-3 |

Table 4: Number of VRBs for E-PHICH transmission

Figure 15

ENHANCED PHICH TRANSMISSION FOR LTE-ADVANCED

CROSS-REFERENCE TO RELATED APPLICATIONS

The present application claims priority to U.S. Provisional Patent Application No. 61/607,436, filed Mar. 6, 2012 by Youn Hyoung Heo, et al., entitled "Enhanced PHICH Transmission for LTE-Advanced" which is incorporated by reference herein as if reproduced in its entirety.

FIELD OF THE DISCLOSURE

The present disclosure relates to control channels in wireless telecommunications systems.

BACKGROUND

As used herein, the term "user equipment" (alternatively "UE") might in some cases refer to mobile devices such as mobile telephones, personal digital assistants, handheld or laptop computers, and similar devices that have telecommunications capabilities. Such a UE might include a device and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might include the device itself without such a module. In other cases, the term "UE" might refer to devices that have similar capabilities but that are not transportable, such as desktop computers, set-top boxes, or network appliances. The term "UE" can also refer to any hardware or software component that can terminate a communication session for a user. Also, the terms "user equipment," "UE," "user agent," "UA," "user device," and "mobile device" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE). For example, an LTE system might include an Evolved Universal Terrestrial Radio Access Network (E-UTRAN) node B (eNB), a wireless access point, or a similar component rather than a traditional base station. Any such component will be referred to herein as an eNB, but it should be understood that such a component is not necessarily an eNB. Such a component may also be referred to herein as an access node.

LTE may be said to correspond to Third Generation Partnership Project (3GPP) Release 8 (Rel-8 or R8) and Release 9 (Rel-9 or R9), and possibly also to releases beyond Release 9, while LTE Advanced (LTE-A) may be said to correspond to Release 10 (Rel-10 or R10) and possibly also to Release 11 (Rel-11 or R11) and other releases beyond Release 10. As used herein, the terms "legacy", "legacy UE", and the like might refer to signals, UEs, and/or other entities that comply with LTE Release 10 and/or earlier releases but do not fully comply with releases later than Release 10. The terms "advanced", "advanced UE", and the like might refer to signals, UEs, and/or other entities that comply with LTE Release 11 and/or later releases. While the discussion herein deals with LTE systems, the concepts are equally applicable to other wireless systems as well.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 15 contains tables related to embodiments of the disclosure.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. Embodiments are described herein in the context of an LTE wireless network or system, but can be adapted for other wireless networks or systems.

In an LTE system, physical downlink control channels (PDCCHs) are used to carry downlink (DL) or uplink (UL) data scheduling information, or grants, from an eNB to one or more UEs. The scheduling information may include a resource allocation, a modulation and coding rate (or transport block size), the identity of the intended UE or UEs, and other information. A PDCCH could be intended for a single UE, multiple UEs or all UEs in a cell, depending on the nature and content of the scheduled data. A broadcast PDCCH is used to carry scheduling information for a physical downlink shared channel (PDSCH) that is intended to be received by all UEs in a cell, such as a PDSCH carrying system information about the eNB. A multicast PDCCH is intended to be received by a group of UEs in a cell. A unicast PDCCH is used to carry scheduling information for a PDSCH that is intended to be received by only a single UE.

Figure 1:
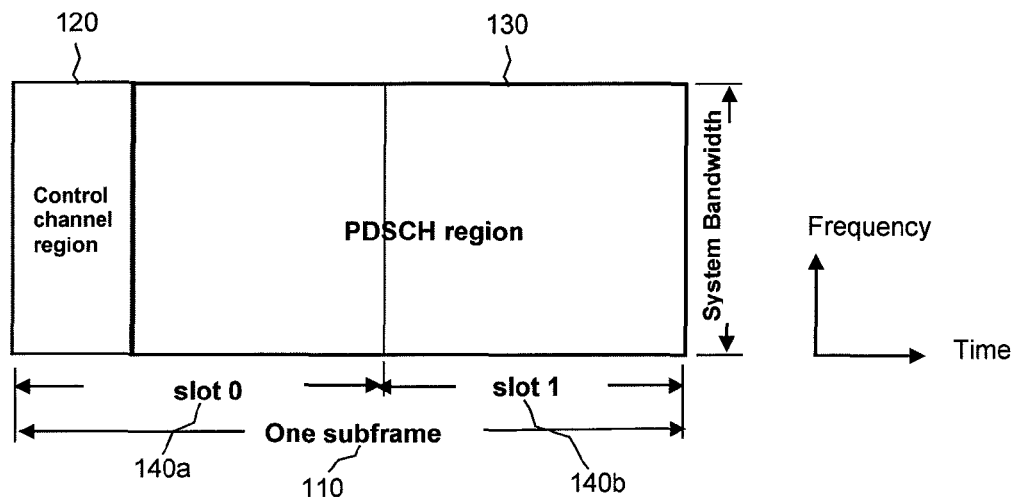
FIG. 1 is a diagram of a downlink LTE subframe, according to the prior art.

FIG. 1 illustrates a typical DL LTE subframe 110. Control information such as the PHICH (physical HARQ (hybrid automatic repeat request) indicator channel), PCFICH (physical control format indicator channel), and PDCCH are transmitted in a control channel region 120. The PHICH is used to transmit HARQ acknowledgements and negative acknowledgements (ACK/NACK), which may indicate whether the eNB has correctly received uplink scheduled data on the physical uplink shared channel (PUSCH).

The control channel region 120 includes the first few OFDM (orthogonal frequency division multiplexing) symbols in the subframe 110. The exact number of OFDM symbols for the control channel region 120 may be dynamically indicated by a control format indicator (CFI) in the PCFICH, which is transmitted in the first symbol. Alternatively, the number of OFDM symbols may be semi-statically configured when cross carrier scheduling is configured in the case of carrier aggregation in LTE Rel-10.

The PDSCH, PBCH (physical broadcast channel), PSC/SSC (primary synchronization channel/secondary synchronization channel), and CSI-RS (channel state information reference signal) are transmitted in a PDSCH region 130. DL user data is carried by the PDSCH channels scheduled in the PDSCH region 130. Cell-specific reference signals are transmitted over both the control channel region 120 and the PDSCH region 130, as described in more detail below.

Each subframe 110 can include a number of OFDM symbols in the time domain and a number of subcarriers in the frequency domain. An OFDM symbol in time and a subcarrier in frequency together define a resource element (RE). A physical resource block (physical RB or PRB) can be defined as, for example, 12 consecutive subcarriers in the frequency domain and all the OFDM symbols in a slot in the time domain. An RB or PRB pair with the same RB index in slot 0 (140a) and slot 1 (140b) in a subframe can be allocated together.

Figure 2:
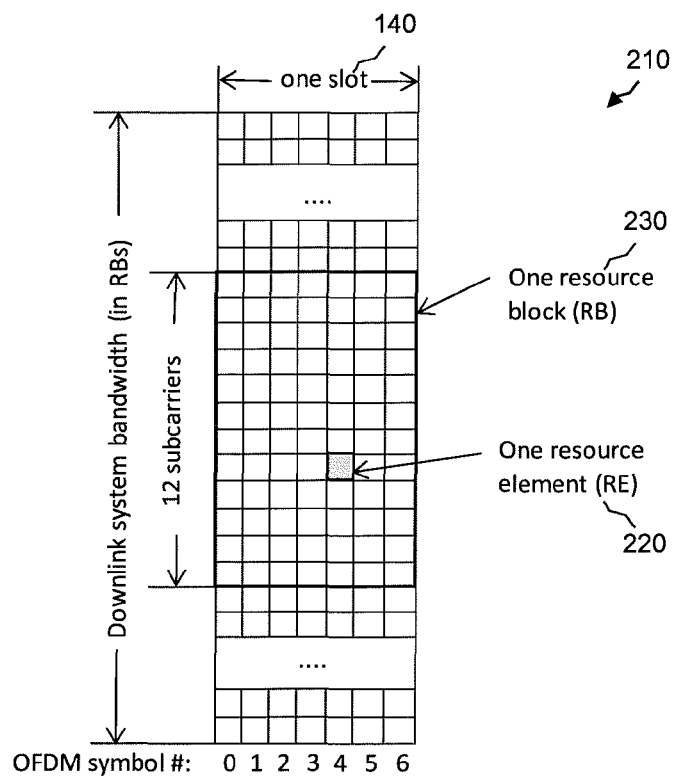
FIG. 2 is a diagram of an LTE downlink resource grid in the case of a normal cyclic prefix, according to the prior art.

FIG. 2 shows an LTE DL resource grid 210 within each slot 140 in the case of a normal cyclic prefix (CP) configuration. The resource grid 210 is defined for each antenna port, i.e., each antenna port has its own separate resource grid 210. Each element in the resource grid 210 for an antenna port is an RE 220, which is uniquely identified by an index pair of a subcarrier and an OFDM symbol in a slot 140. An RB 230 includes a number of consecutive subcarriers in the frequency domain and a number of consecutive OFDM symbols in the time domain, as shown in the figure. An RB 230 is the minimum unit used for the mapping of certain physical channels to REs 220.

Figure 3:
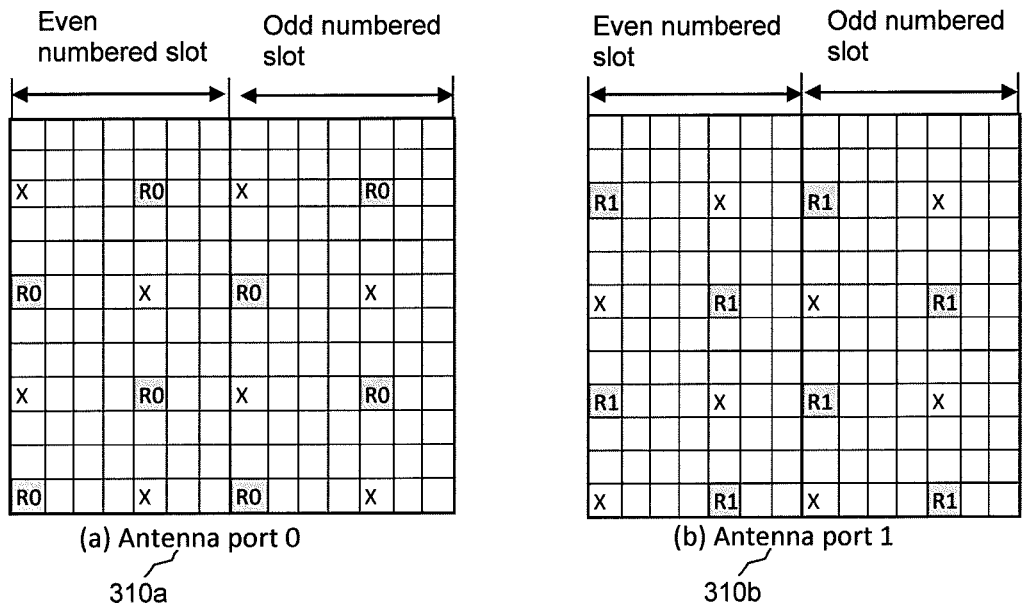
FIG. 3 is a diagram of a mapping of a cell-specific reference signal in a resource block in the case of two antenna ports at an eNB, according to the prior art.

For DL channel estimation and demodulation purposes, cell-specific reference signals (CRSs) can be transmitted over each antenna port on certain pre-defined time and frequency REs in every subframe. CRSs are used by Rel-8 to Rel-10 legacy UEs to demodulate the control channels. FIG. 3 shows an example of CRS locations in a subframe for two antenna ports 310a and 310b, where the RE locations marked with "R0" and "R1" are used for CRS port 0 and CRS port 1 transmission, respectively. REs marked with "X" indicate that nothing should be transmitted on those REs, as CRSs will be transmitted on the other antenna.

Figure 4:
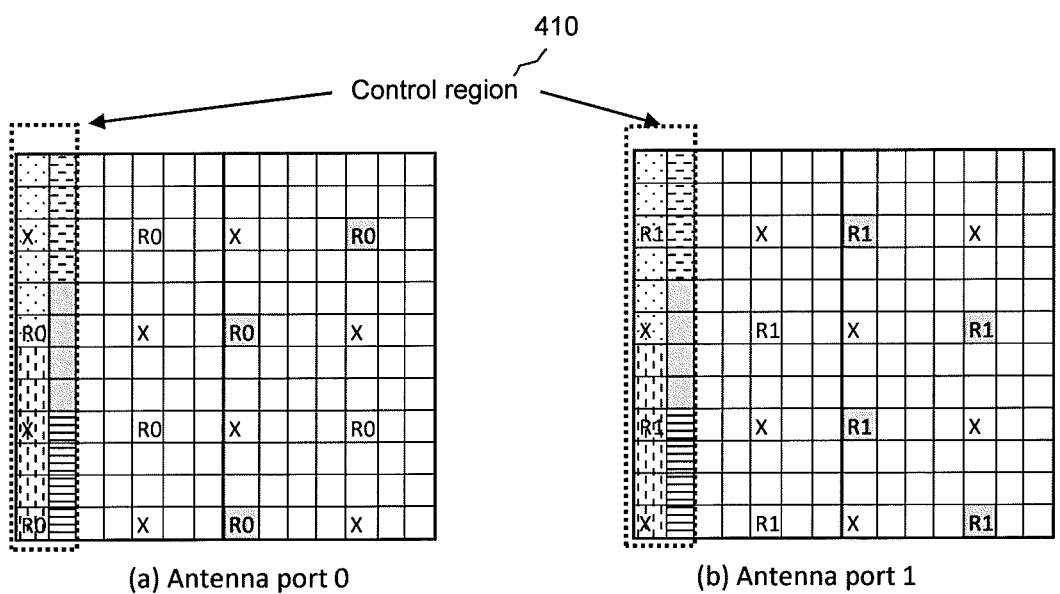
FIG. 4 is a diagram of a resource element group allocation in a resource block in the first slot when two antenna ports are configured at an eNB, according to the prior art.

Resource element groups (REGs) are used in LTE for defining the mapping of control channels such as the PDCCH to REs. A REG includes either four or six consecutive REs in an OFDM symbol, depending on whether the CRSs are included. For example, for the two-antenna port CRSs shown in FIG. 3, the REG allocation in each RB is shown in FIG. 4, where the control region 410 includes two OFDM symbols and different REGs are indicated with different types of shading. REs marked with "R0" or "X" in FIG. 4a or with "R1" or "X" in FIG. 4b are reserved for CRSs for antenna port 0 and antenna port 1, and therefore only four REs in each REG are available for carrying control channel data.

A PDCCH can be transmitted on an aggregation of one or more consecutive control channel elements (CCEs), where one CCE consists of, for example, nine REGs. The CCEs available for a UE's PDCCH transmission are numbered from 0 to $n_{CCE}-1$. In LTE, multiple formats are supported for the PDCCH as shown in Table 1 in FIG. 15.

The number of CCEs available in a subframe depends on the system bandwidth and the number of OFDM symbols configured for the control region. For example, in a 10 MHz system with three OFDM symbols configured for the control region and six groups configured for the PHICH, 42 CCEs are available for the PDCCH.

Multiple PDCCHs may be multiplexed in the control region in a subframe to support UL and DL data scheduling for one UE and to support DL and UL scheduling for more than one UE. For a given system bandwidth, the number of PDCCHs that can be supported in the control region also depends on the aggregation level used for each PDCCH. The aggregation level indicates how many CCEs are aggregated to carry a PDCCH. The aggregation level for a given target packet error rate is determined by the downlink received signal quality at a UE and the size of the downlink control information (DCI) to be carried by a PDCCH. In general, a high aggregation level is needed for a PDCCH intended for a UE that is at the cell edge and is far away from the serving eNB, or when a DCI with a large payload size is used.

The legacy PDCCH region in LTE may have capacity issues for some new applications or deployment scenarios where the number of scheduled UEs in a subframe could be large. Some examples include multiple user multiple input multiple output (MU-MIMO) transmission, coordinated multi-point (CoMP) transmission, heterogeneous network (hetnet) deployment with remote radio heads (RRHs) in a cell sharing the same cell ID, and carrier aggregation (CA). With these deployment scenarios, there may be a need to enhance the capacity of the PDCCH and at the same time to limit the number of blind decodes required by an advanced UE.

Figure 5:
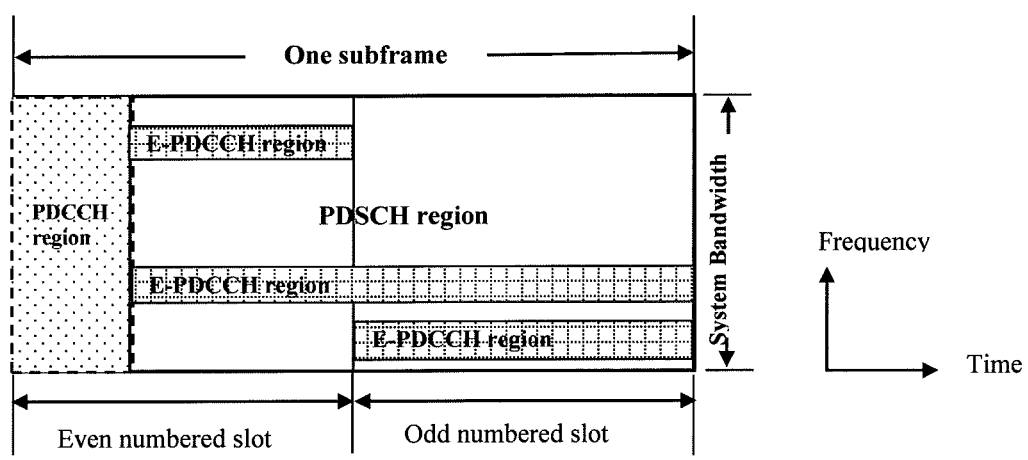
FIG. 5 is a diagram of E-PDCCH regions, according to an embodiment of the disclosure.

One approach for PDCCH capacity enhancement is to transmit DCI in the legacy PDSCH region. That is, some RBs or PRB pairs in the traditional PDSCH region can be reserved for DCI transmission to UEs. Hereinafter, a physical downlink control channel transmitted in the legacy PDSCH region will be referred to as an extended or enhanced PDCCH (E-PDCCH). A set of RBs and OFDM symbols or PRB pairs reserved for this purpose can be referred to as an E-PDCCH region. The E-PDCCH region in a subframe is not necessarily completely filled with E-PDCCHs in that some resources in the E-PDCCH region not used for E-PDCCH transmission can be assigned for PDSCH transmission. In addition, for some scenarios, the legacy PDCCH region may or may not be present in a subframe containing an E-PDCCH region. The time and frequency resources of an E-PDCCH region may be configurable. Examples of E-PDCCH regions are shown in FIG. 5.

Multiple PHICHs may be transmitted in the same set of resource elements and may be defined as a PHICH group. In the same PHICH group, multiple PHICHs may be multiplexed with different complex orthogonal Walsh sequences. In the case of a normal cyclic prefix, eight PHICHs can be multiplexed within a PHICH group, as the length of the orthogonal sequence is four and the PHICHs are also multiplexed over the I and Q branches. Meanwhile, four PHICHs can be multiplexed within a PHICH group with length-2 Walsh sequences.

For PHICH resource configuration, two parameters are signaled in the master information block (MIB): the PHICH duration and the number of PHICH groups. The duration of the PHICH specifies the number of OFDM symbols that the PHICH is distributed over. To avoid dependency with the PCFICH, the duration is independently signaled and can be different from the control region for the PDCCH. The second parameter is used to define the amount of PHICH resources, i.e., the number of PHICH groups. The mapping between PHICH resources and the corresponding uplink scheduled transmission is implicit. That is, there is a predefined mapping rule between the PHICH resource index and the PUSCH PRB index transmitting the uplink shared channel. Because there can be a PUSCH transmission without a PDCCH, e.g., in the case of resource non-adaptive retransmission, the PHICH resource is mapped to the actual PUSCH PRB index instead of the PDCCH CCE index.

A PHICH resource is identified by the index pair $(n_{PHICH}^{group}, n_{PHICH}^{seq})$ where $n_{PHICH}^{group}$ is the PHICH group number and $n_{PHICH}^{seq}$ is the orthogonal sequence index within the group. As a PHICH resource is implicitly defined by the lowest PRB index in the first slot of the corresponding PUSCH transmission, the UE derives the assigned index pair with the scheduled PUSCH PRB index. If the PHICH resource is smaller than the number of PUSCH PRBs or if multiple users are scheduled in the same PUSCH PRBs, a collision can happen. That is, the same PHICH resource may be assigned to multiple UEs. To avoid a collision, a different cyclic shift value, which is indicated in the uplink DCI format, may be used to derive the assigned PHICH resource. More specifically, the following equation may be used to determine the index pair.

$$n_{PHICH}^{group} = (I_{PRB\_RA}^{lowest\_index} + n_{DMRS}) \bmod N_{PHICH}^{group} + I_{PHICH} N_{PHICH}^{group} \quad (1)$$

$$n_{PHICH}^{seq} = (\lfloor I_{PRB\_RA}^{lowest\_index}/N_{PHICH}^{group} \rfloor + n_{DMRS}) \bmod 2N_{SF}^{PHICH} \quad (2)$$

In the above equation, $n_{DMRS}$ is mapped from the cyclic shift for the demodulation reference signal (DMRS) field in the most recent DCI format 0 or 4 for the transport block associated with the corresponding PUSCH transmission. $n_{DMRS}$ is set to zero if there is no PDCCH with DCI format 0 or 4 for the same transport block and if the initial PUSCH for the same transport block is semi-persistently scheduled or the initial PUSCH for the same transport block is scheduled by the random access response grant. $N_{SF}^{PHICH}$ is the spreading factor size used for PHICH modulation as described in section 6.9.1 of 3GPP Technical Specification (TS) 36.213. $I_{PRB\_RA}^{lowest\_index}$ is the lowest PRB index in the first slot of the corresponding PUSCH transmission. $N_{PHICH}^{group}$ is the number of PHICH groups configured by higher layers as described in section 6.9 of 3GPP TS 36.213.

$$I_{PHICH} = \begin{cases} 1 & \text{for } TDD \ UL/DL \text{ configuration 0 with } PUSCH \text{ transmission in subframe } n = 4 \text{ or } 9 \\ 0 & \text{otherwise} \end{cases}$$

The E-PDCCH specified in LTE Rel-11 systems may support increased control channel capacity, may support frequency domain inter-cell interference coordination (ICIC), may achieve improved spatial reuse of control channel resources, may support beamforming and/or diversity, may operate on advanced carrier types and in MBSFN subframes, and may coexist on the same carrier with legacy UEs. In some cases, the E-PDCCH may be transmitted by using PDSCH resources, so the introduction of the E-PDCCH may have no impact on legacy PDCCH transmissions. Further, the E-PDCCH may increase control channel capacity by borrowing PDSCH resources.

To support frequency domain ICIC and to multiplex with the PDSCH, the E-PDCCH may be transmitted within downlink PRBs or PRB pairs instead of being spread over the entire system bandwidth. In the time domain, if the E-PDCCH is distributed over the subframe in the PDSCH region, additional signaling may not be necessary. Otherwise, the number of OFDM symbols may need to be signaled. The E-PDCCH region in the frequency domain and time domain may be signaled with radio resource control (RRC) signaling or dynamic signaling.

The E-PDCCH region may be multiplexed with the PDSCH only in the frequency domain. Therefore, E-PDCCHs may be transmitted in different PRBs or PRB pairs from the PRB pairs on which PDSCHs are transmitted. Alternatively, the E-PDCCH and the PDSCH may be transmitted in the same PRB or PRB pair by dividing the number of OFDM symbols in the time domain.

Both localized and distributed transmission may be supported for the E-PDCCH. At least for localized transmission, and for distributed transmission where the CRS is not used for demodulation of the enhanced control channel, the demodulation of the enhanced control channel may be based on the DMRS transmitted in the PRBs or PRB pairs used for transmission of the E-PDCCH.

Given that the E-PDCCH has been introduced because the capacity of the PDCCH may be insufficient, an issue that may arise is whether the capacity of the legacy PHICH is sufficient. In a Rel-8 LTE system, the number of PHICHs is dependent on the number of PRBs, the number of orthogonal sequences, and the parameter $N_g$ where $N_g \in \{1/6, 1/2, 1, 2\}$ is provided by higher layers. For example, in case of 20 MHz and the normal cyclic shift, the maximum number of PHICHs is 200 if $N_g$ is configured as 2. Meanwhile, in the case of the PDCCH, the maximum number of PDCCHs is 88, assuming that the PDCCH aggregation level is 1 and that three OFDM symbol are used for the control region. According to this brief calculation, it can be seen that the maximum number of PHICH resources is approximately double of the number of PRBs in the same system bandwidth. However, although the number of PHICH resources is larger than the PDCCH resource capacity, increasing the PHICH capacity may be important in some scenarios. For example, when an additional carrier without a control region is supported or when a control channel experiences strong interference, the PHICH for the additional carrier may need to be transmitted on the primary carrier. Another example is the scenario where remote radio heads (RRHs) with the same cell ID as the macro eNB are supported. In this case, the number of UEs scheduled to transmit the PUSCH may be dramatically increased. Furthermore, the current PHICH structure may not be efficient for frequency domain ICIC because the PHICH is distributed over the entire system bandwidth.

Embodiments of the present disclosure provide a detailed design for an extended or enhanced PHICH (E-PHICH) structure, including resource allocation and multiplexing between the E-PHICH and the E-PDCCH. More specifically, at least four issues related to the E-PHICH are identified, and at least one set of embodiments is disclosed for each of the issues. The embodiments will be briefly summarized, and then details will be provided for each set of embodiments.

The first set of embodiments deals with multiplexing of the E-PHICH with the E-PDCCH or the PDSCH. Five different approaches are provided in this first set of embodiments. In a first approach, E-PHICHs may be transmitted with localized E-PDCCH transmission in the same PRBs or PRB pairs as the PRBs used for the E-PDCCHs. In a second approach, E-PHICHs may be transmitted in PRBs or PRB pairs for E-PDCCHs configured with distributed transmission. In a third approach, E-PHICHs may be transmitted in PRBs or PRB pairs where commonly monitored E-PDCCHs are transmitted. A common search space may be defined for E-PDCCHs to transmit DCI formats aimed to all UEs or group of UEs. E-PHICHs may be multiplexed with E-PDCCHs in the PRBs or PRB pairs reserved for the common search space. In a fourth approach, E-PHICHs may be transmitted in PRBs or PRB pairs for PDSCH transmission. An E-PHICH may be transmitted in a different PRB or PRB pair from an E-PDCCH. In order to avoid wasting resources when all REs are not used for PHICH resources, the E-PHICH may be multiplexed with the PDSCH in the same PRBs or PRB pairs. In a fifth approach, an E-PHICH may be transmitted alone in separate virtual resource blocks (VRBs). Different E-PHICH groups may be multiplexed and interleaved before mapping across VRBs. The VRBs may then be mapped to PRBs in a distributed manner. Frequency hopping may be applied to the second slot of the VRBs.

The second set of embodiments deals with resource allocation for the E-PHICH. Multiple PHICH resource sets may be defined to efficiently utilize E-PHICH resources. Each PHICH resource set can be mapped to a PUSCH PRB index. The actually used E-PHICH resource set may be explicitly indicated with semi-static signaling or dynamic signaling. Alternatively, the actually used E-PHICH resource may be implicitly indicated with a CCE index of the E-PDCCH or PDCCH transmitting the uplink grant.

The third set of embodiments deals with monitoring and receiving the PHICH and the E-PHICH. When both the PHICH in the legacy control region and the E-PHICH are supported and configured, the UE may monitor and receive both the PHICH and the E-PHICH. In this case, the actual PHICH or E-PHICH resource may be determined depending on the PUSCH PRB index and the DMRS cyclic shift, where the number of E-PHICHs that are supported could be signaled or re-interpreted from the PBCH or signaled through higher layer signaling. Alternatively, the UE may receive the E-PHICH only if the UE is configured to monitor the E-PDCCH region or if the eNB configures the UE to receive the E-PHICH only.

The fourth set of embodiments deals with inter-cell interference management for the E-PHICH. To avoid interference in E-PHICH transmissions between neighbor cells, inter-cell interference coordination may be supported for E-PHICH transmissions. In one embodiment, a signal related to a PHICH resource may be exchanged between cells, and the E-PHICH resource parameter may be signaled to the connected UEs. The detailed E-PHICH procedure may depend on whether the legacy control region is supported or not.

Details about each of these four sets of embodiments will now be provided.

In the first approach under the first set of embodiments dealing with multiplexing of the E-PHICH and the E-PDCCH or the PDSCH, E-PHICHs are transmitted in VRBs for E-PDCCHs configured with localized transmission. In localized E-PDCCH transmission, an E-PDCCH is transmitted in either one or multiple consecutive VRBs that are not used for transmission of other E-PDCCHs. Since one E-PDCCH is transmitted within one or multiple PRBs (or PRB pairs) and precoded DMRS is used, interleaving between multiple E-PDCCHs as used in the legacy PDCCH may not be supported in localized E-PDCCH transmissions. The VRBs may be mapped to PRBs, which may be either consecutive or non-consecutive in frequency.

Figure 6:
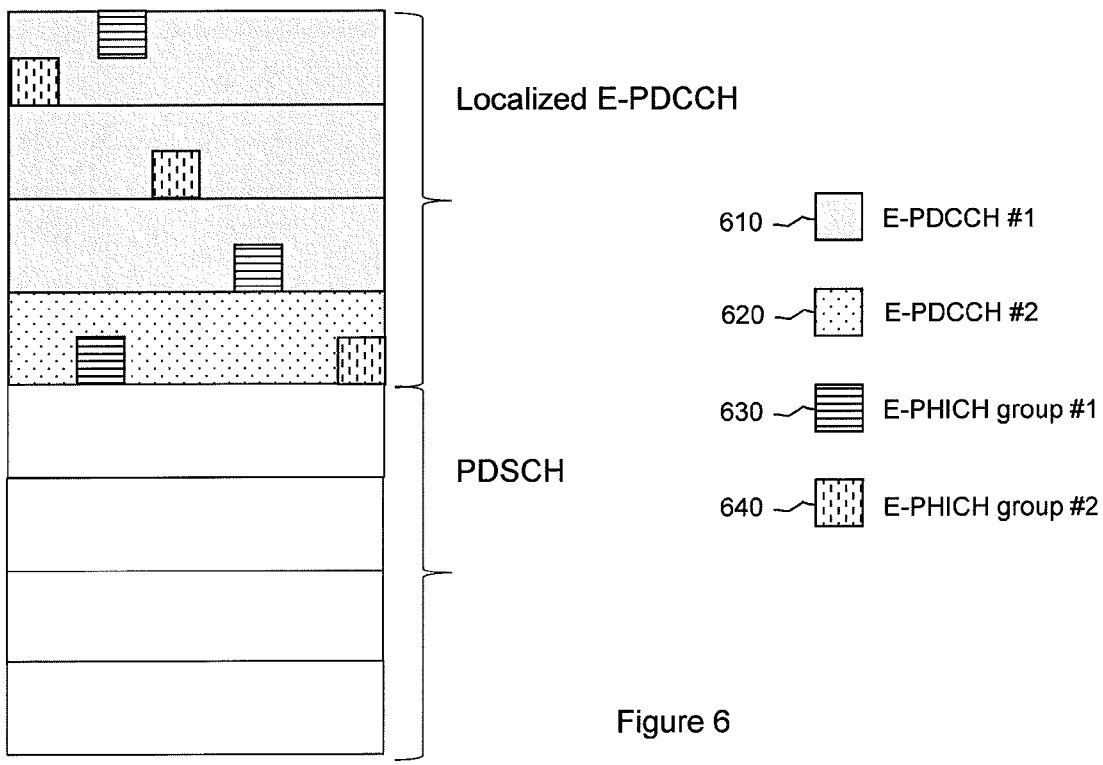
FIG. 6 is a diagram of multiplexing an E-PHICH and an E-PDCCH with localized transmission, according to an embodiment of the disclosure.

FIG. 6 shows one example of multiplexing the E-PHICH and the E-PDCCH with localized transmission. Two E-PDCCHs 610 and 620 that are transmitted in separate PRB pairs are illustrated. Two E-PHICH groups 630 and 640 are shown, each of which contains multiple units (as the PHICH is repeated three times as defined in Rel-8), and these units are spread across the whole E-PDCCH region. For localized E-PDCCH transmission, as precoding could be applied to both the E-PDCCH and the corresponding DMRS, the precoded DMRS may not be suitable for decoding the E-PHICH because the E-PHICH may contain ACK/NACKs for multiple UEs. In this case, a common reference signal, such as the CRS or a transmission point (TP)-specific reference signal that is not precoded, may be used for E-PHICH decoding. However, if three repetitions of an E-PHICH group are transmitted in separate PRB pairs, a precoded DMRS may still be used to decode the E-PHICH because the precoding vectors used in each PRB pair may not be the same, thus creating some spatial diversity in addition to frequency/time diversity.

While a region may be semi-statically defined for localized E-PDCCH transmission, not all the PRB pairs may carry the E-PDCCH at all times. Thus, it is possible that some of the PRB pairs defined in a region for localized E-PDCCH may be used to carry the PDSCH in some subframes. In such a situation, the E-PHICH could still be transmitted in these PRB pairs. If the PDSCHs transmitted in such PRB pairs are for legacy UEs, the UEs may not be aware of the E-PHICH, and data may be punctured, which could degrade the PDSCH performance. If the PDSCHs transmitted in such PRB pairs are for Rel-11 or beyond UEs, rate matching may be applied to those REs reserved for the E-PHICH. In either case, Rel-11 or beyond UEs may still expect to receive the E-PHICH in these PRB pairs.

If a distributed E-PDCCH transmission is defined as to transmit an E-PDCCH on PRBs or maybe even smaller units, and such PRBs or units for transmitting the same E-PDCCH are distributed across a wide frequency bandwidth, the E-PHICH transmission may be multiplexed in a similar way as it is multiplexed with an E-PDCCH with a localized E-PDCCH transmission.

Figure 7:
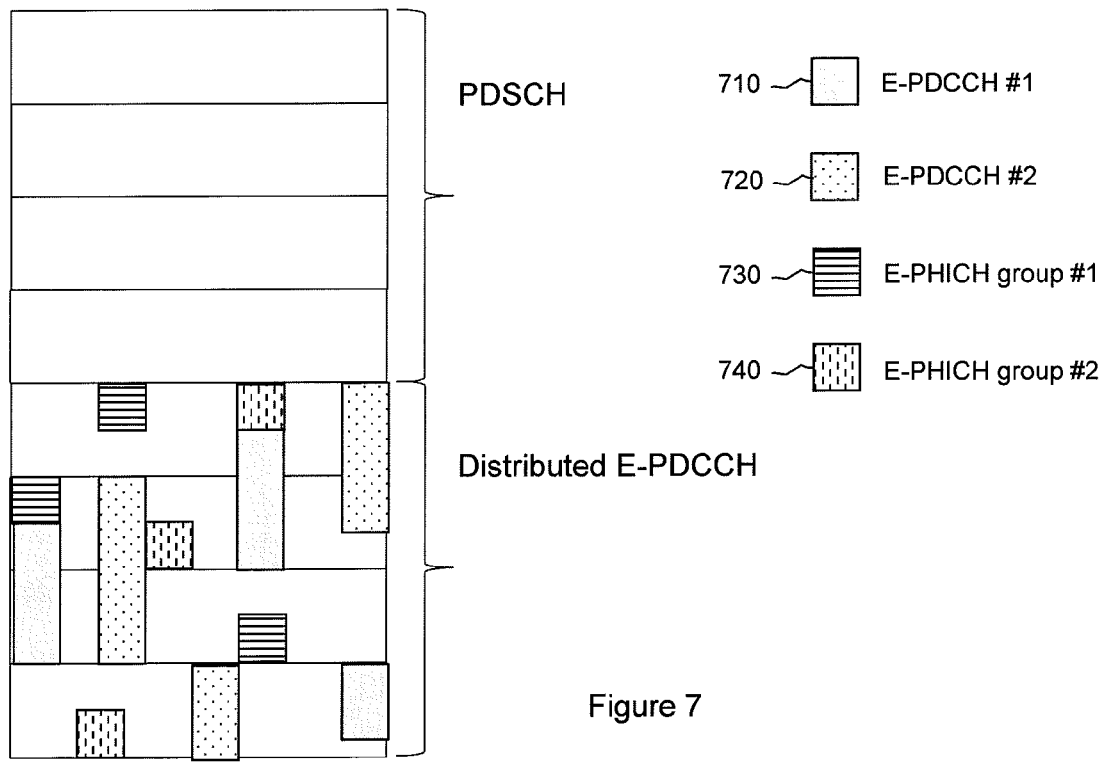
FIG. 7 is a diagram of multiplexing an E-PHICH and an E-PDCCH with distributed transmission, according to an embodiment of the disclosure.

In the second approach under the first set of embodiments dealing with multiplexing of the E-PHICH and the E-PDCCH or the PDSCH, E-PHICHs are transmitted in VRBs for E-PDCCHs configured with distributed transmission. For an E-PDCCH with distributed transmission, multiple E-PDCCHs may be multiplexed and interleaved together and transmitted on the same VRBs. Given that a higher reliability is generally needed for HARQ-ACK transmissions than for scheduling grants and that the same E-PHICH time/frequency resource may be shared by multiple UEs with an orthogonal Walsh sequence, a distributed transmission may be more suitable than a localized transmission for the E-PHICH to achieve more frequency diversity instead of frequency selectivity. Therefore, instead of transmitting the E-PHICH in all distributed and localized E-PDCCH resource regions, the E-PHICH may be multiplexed with the E-PDCCH and may be configured only with distributed transmission and use a non-precoded DMRS for decoding. As shown in FIG. 7, two E-PDCCHs 710 and 720 are multiplexed and transmitted on the same PRB pairs, and two E-PHICH groups 730 and 740 are transmitted from the same PRB pairs as the E-PDCCH.

If E-PDCCH resources are RRC configured, then the E-PHICH may be multiplexed together with the distributed E-PDCCH (cross-interleaved). Two regions may be configured for the E-PDCCH, one distributed and the other localized. Although two regions may be configured, it is possible that only the distributed E-PDCCH region contains E-PHICH resources. A UE may be configured to do E-PDCCH blind decoding in one or both regions (i.e., distributed only, localized only, or both). However, all UEs may need to decode the E-PHICH in a distributed E-PDCCH region if a HARQ-ACK is expected, because the E-PHICH may be transmitted only in the distributed E-PDCCH region in this case.

In the distributed E-PDCCH region, some resources may be configured for the E-PHICH. REGs could be defined over the VRBs, and some REGs may be for the E-PHICH only. E-PHICH groups may be similarly defined as in the legacy PHICH. The rest of the REGs may then be grouped into CCEs and used for the E-PDCCH.

A reference signal for demodulation may be shared in the region. Either a CRS or a non-precoded DMRS may be used. In the case of a DMRS, the number of DMRS ports may be the same as the number of CRS ports as indicated by decoding the PBCH. Alternatively, the number of DMRS ports may be different from the number of CRS ports and may be configured by RRC signaling. Different DMRS ports or sequence may be configured and used in different cells.

The REG definition in OFDM symbols with a DMRS and/or a CSI-RS may need to be modified, as the REs in an OFDM symbol may not be an even number or multiples of four REs. One alternative for REG definition in those OFDM symbols may be to define a REG as a 2RE×2RE square unit that occupies two consecutive REs in the frequency domain and two consecutive REs in the time domain. In another alternative, a REG could be divided into two pairs of REs, each consisting of two consecutive REs in the frequency domain. These two pairs of REs could be consecutively allocated along frequency, but in the case where there are not enough REs left in an OFDM symbol, the second pair could start from the next OFDM symbol. The allocation of REs for an E-PHICH REG may skip those REs reserved for DMRS or CSI-RS transmission. If there is only one orphan RE left in an OFDM symbol, the RE may be skipped.

Transmit diversity may be used, and random beamforming may also be possible, either on a per-RB or a per-REG basis, but precoding vectors may need to be predefined in case of per-REG beamforming.

Figure 8:
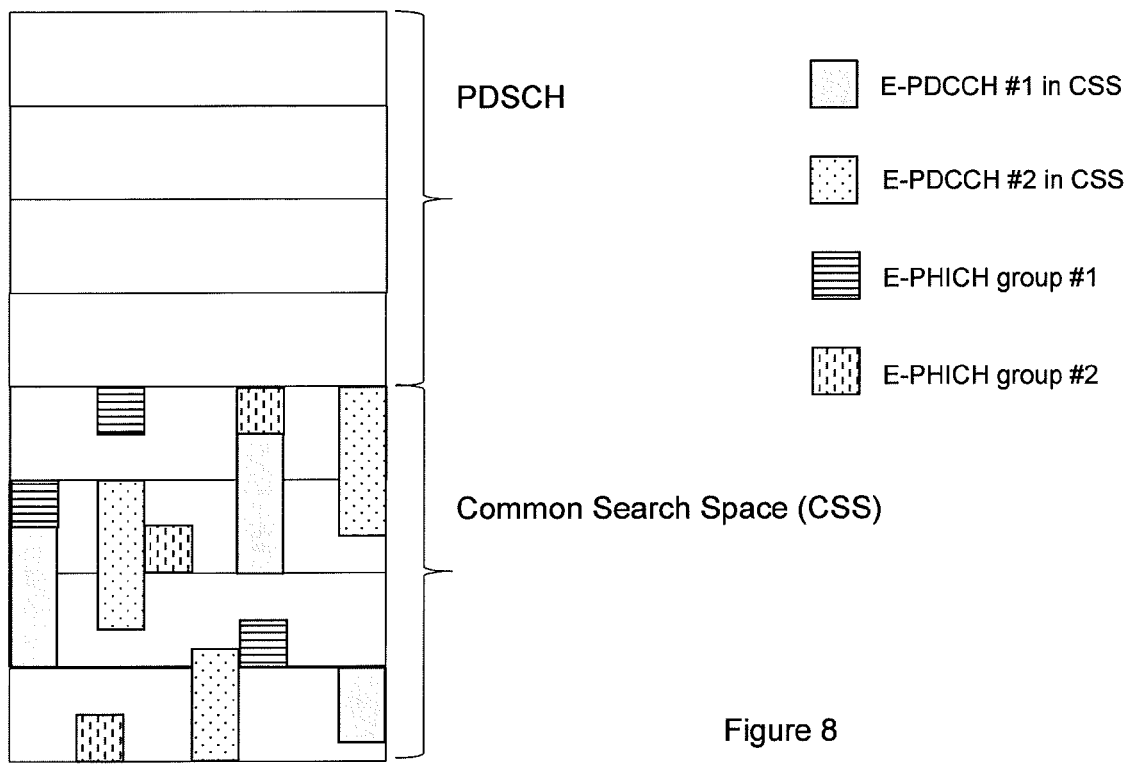
FIG. 8 is a diagram of transmitting an E-PHICH in a common search space, according to an embodiment of the disclosure.

In the third approach under the first set of embodiments dealing with multiplexing of the E-PHICH and the E-PDCCH or the PDSCH, E-PHICHs are transmitted in VRBs for E-PDCCHs that are commonly monitored. That is, it may be possible to multiplex an E-PHICH with an E-PDCCH monitored by all UEs or group of UEs, for instance in a common search space. For example, the E-PHICH may be transmitted in the same VRBs configured as the common search space for the E-PDCCH as shown in FIG. 8. The resources used to transmit the E-PHICH may be pre-defined and known to the UE. The resources may be interleaved with the E-PDCCHs that carry the common message. The UE may only need to decode the E-PHICH when the UE expects ACK/NACK signals. For the E-PHICH, transmit diversity may be used and/or a non-precoded DMRS may be used as a reference signal.

In the fourth approach under the first set of embodiments dealing with multiplexing of the E-PHICH and the E-PDCCH or the PDSCH, E-PHICHs are transmitted in PRB pairs for PDSCH transmission. In this case, E-PHICH resources may be within the resources used for the PDSCH. That is, the E-PHICH may be multiplexed with the PDSCH in the same PRB pairs. The PRBs used for the E-PHICH may be defined similarly to the way the E-PDCCH regions are defined. For example, the number and location of E-PHICH RBs may be signaled to advanced UEs or may be predefined.

The maximum number of resource elements required for the legacy PHICH is calculated in Table 2 in FIG. 15 with respect to the system bandwidth. Table 3 in FIG. 15 shows available resource elements in a PRB pair in a subframe for PDSCH data transmission for different control region configurations and four CRS ports. Assuming the same or a similar amount of PHICH resources may need to be supported in the E-PHICH, then a maximum of three PRB pairs may be needed for 20 MHz, and less than one PRB pair may be needed for 5 MHz or less.

Figure 9:
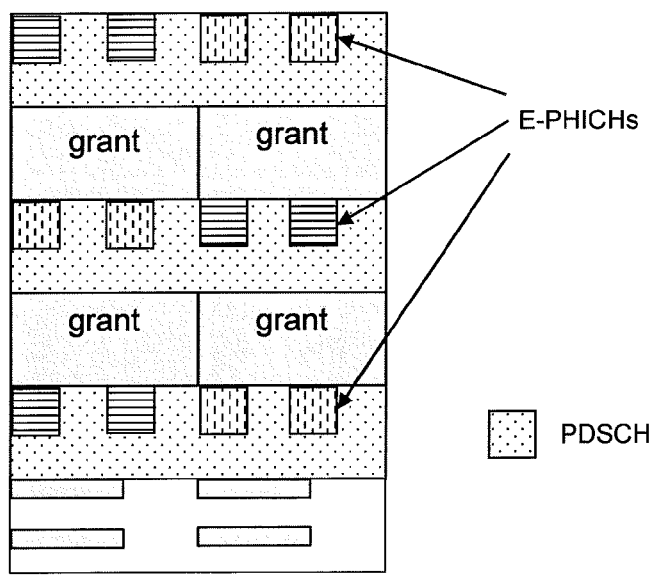
FIG. 9 is a diagram of multiplexing an E-PHICH and a PDSCH, according to an embodiment of the disclosure.

Given the number of REs in one PRB pair as shown in Table 3, the granularity for E-PHICH resources may be coarse if only the E-PHICH is transmitted in a PRB pair. To avoid wasting resources while providing sufficient diversity in frequency and/or time, the E-PHICH may be mapped to REs that are otherwise used for PDSCH transmission, as illustrated in FIG. 9. The manner in which the E-PHICHs are mapped in the PDSCH may be pre-defined or configured through higher signaling. The E-PHICH may take resources in units of REG in a similar way as the legacy PHICH does in the PDCCH region. The unit REG may be composed of, e.g., four closely located REs. Since the E-PHICH may be spread out and may not be required to take as many REs within a PRB pair as possible, higher-order diversity may be achieved, which may lead to better performance of the PHICH.

There are at least two options for the PDSCH in terms of how to take into account the REs that are reserved for E-PHICHs. If the PDSCHs are used for legacy UEs, puncturing of the PDSCHs at the RE locations configured for E-PHICHs may be used to ensure that legacy UEs can still receive the PDSCH. If the PDSCHs are used for advanced UEs only, then rate matching may be applied to take into account the REs reserved for E-PHICHs.

As an E-PHICH group may contain PHICHs for multiple UEs, the reference signal used for decoding may need to be a common reference signal, such as a cell-specific reference signal or a TP-specific reference signal. Such a reference signal may be different from the reference signal for PDSCH decoding, which could be precoded.

In the fifth approach under the first set of embodiments dealing with multiplexing of the E-PHICH and the E-PDCCH or the PDSCH, E-PHICHs are transmitted in their own VRBs. That is, an E-PHICH may be transmitted in a VRB that is used only to carry HARQ ACK/NACK signals. As seen from Table 2 and Table 3 in FIG. 15, for a system bandwidth of 5 MHz to 20 MHz, the required number of REs for the E-PHICH is in the range of REs that can be carried by one to three PRB or VRB pairs. So one to three PRBs in both slots could be assigned to transmit the E-PHICH only in the legacy PDSCH region. Table 4 in FIG. 15 shows the possible number of VRB pairs that may be used to carry an E-PHICH-only transmission for different system bandwidths.

Figure 10:
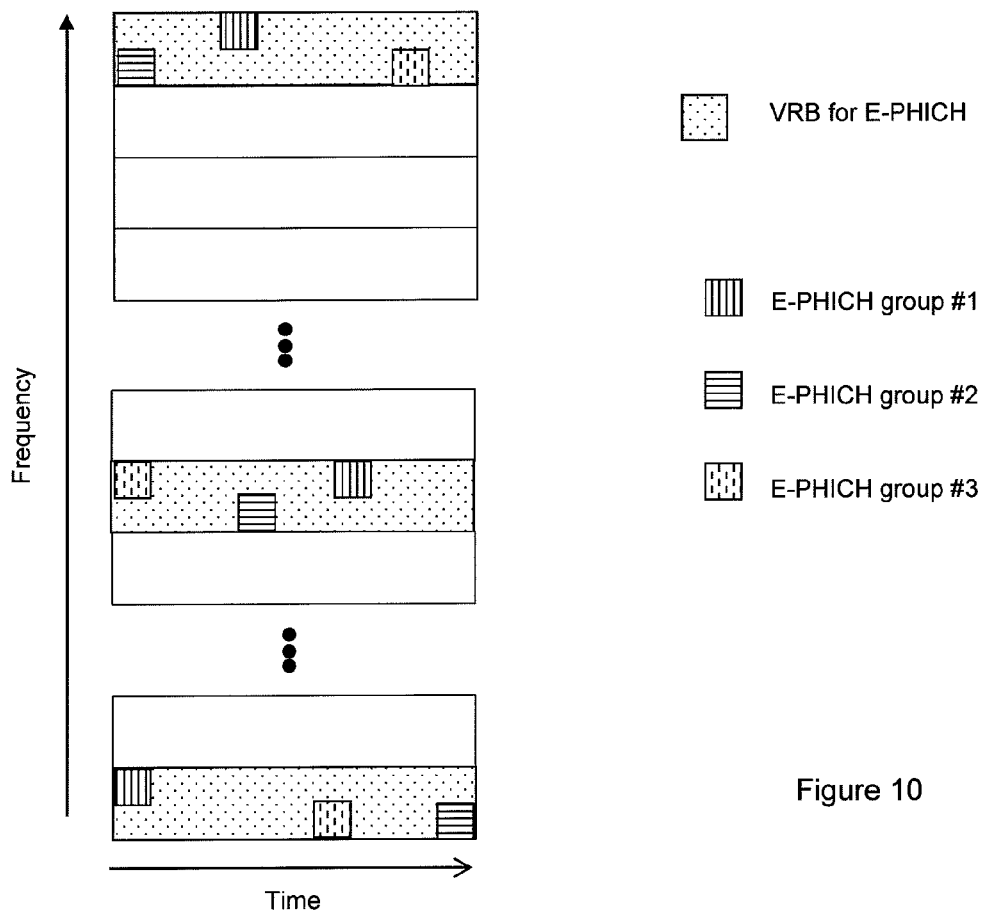
FIG. 10 is a diagram of allocating three virtual resource block pairs for an E-PHICH, according to an embodiment of the disclosure.
Figure 11:
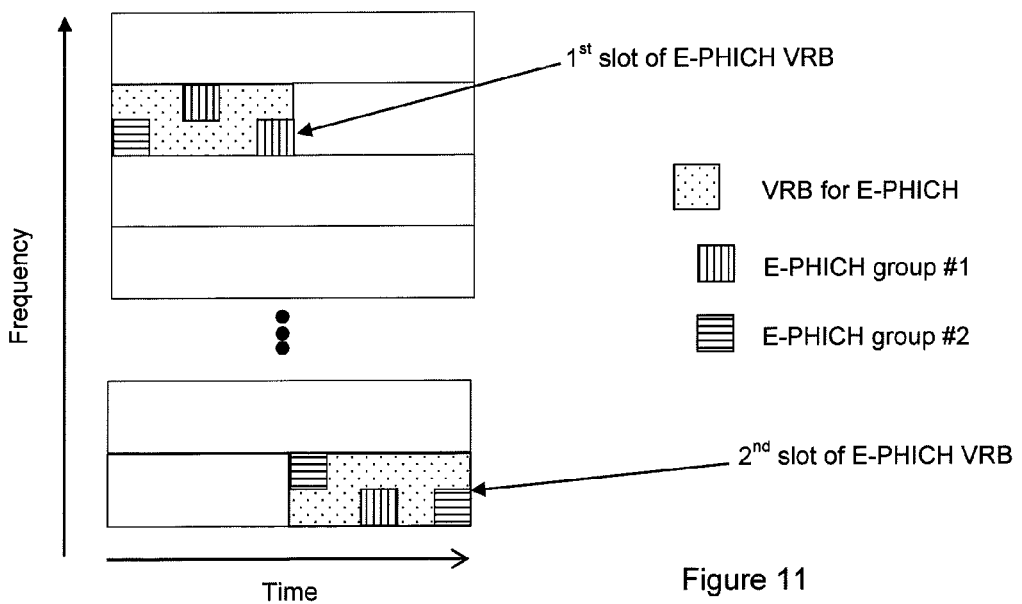
FIG. 11 is a diagram of allocating one virtual resource block pair for an E-PHICH, according to an embodiment of the disclosure.

Similar to the PHICH, each E-PHICH may consist of three REGs, which represent its three repetitions. As shown in FIG. 10, REGs carrying one E-PHICH group may be multiplexed and interleaved with REGs of other E-PHICH groups and mapped across assigned VRBs in both slots that only carry an E-PHICH. These VRBs in both slots may then be mapped to PRBs in distributed manners across the whole system bandwidth, thus creating more frequency diversity gain. If there is only one pair of VRBs in both slots of a subframe configured, as shown in FIG. 11, in order to still maintain necessary frequency diversity, hopping operation may be applied to the VRB in the second slot (i.e., a VRB of the distributed type), so that the VRBs are transmitted at different frequencies in the first and second slots. As the VRB configuration parameters (e.g., distributed vs localized, gap 1 vs gap 2) can be shared between multiple common downlink control channels, such as the E-PHICH and the common search space of the E-PDCCH, such parameters may be signaled once for all relevant enhanced downlink control channels.

Figure 12:
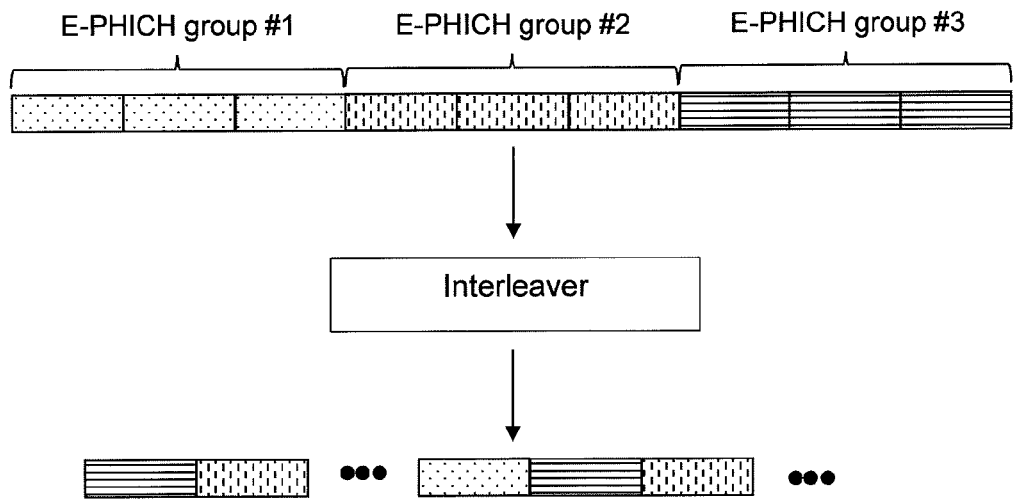
FIG. 12 is a diagram of an E-PHICH interleaving process, according to an embodiment of the disclosure.

For the interleaving process, as shown in FIG. 12 as an example, REGs of different E-PHICH groups may be lined up according to their E-PHICH group number. A REG-based interleaver, such as a row-in/column-out block interleaver, may be applied, whose output is REGs from different E-PHICH groups in mixed order.

In an embodiment, 2-tx and 4-tx transmit diversity (TxD) based on Alamouti coding may be applied to an E-PHICH transmission. The configuration of antenna number for TxD may be signaled to the UE or may be implied by another configuration, such as that for distributed E-PDCCH transmission. A CRS may be used for decoding the E-PHICH in such a transmission. Alternatively, a DMRS without channel dependent precoding may be used for this purpose. If hopping is applied to the second slot (i.e., DVRB), the DMRS may need to be re-designed to ensure that the performance of the E-PHICH is maintained, especially in high mobility situations.

The location of such PRB pairs for E-PHICH-only transmission may vary for different cells or TPs to avoid collisions of E-PHICHs from different cells and TPs. One way to implement this variance is to link the locations of PRB pairs for the E-PHICH to the cell ID or an additional or alternative parameter distinct to each TP.

The configuration of an E-PHICH-only transmission may be semi-statically signaled to the UE through higher layer signaling, such as RRC signaling. The configuration may include parameters such as the number of VRB used, the VRB-to-PRB mapping, the location where the second slot is hopped to, the transmit mode (e.g., TxD), the number of transmit antennas, and the corresponding reference signal ports for decoding.

A benefit of configuring VRBs for E-PHICH-only transmission is that E-PHICH transmission could be configured independently from that of the E-PDCCH, especially for the case where only a localized E-PDCCH region is defined and a pre-coded DMRS is used for the E-PDCCH.

Figure 13:
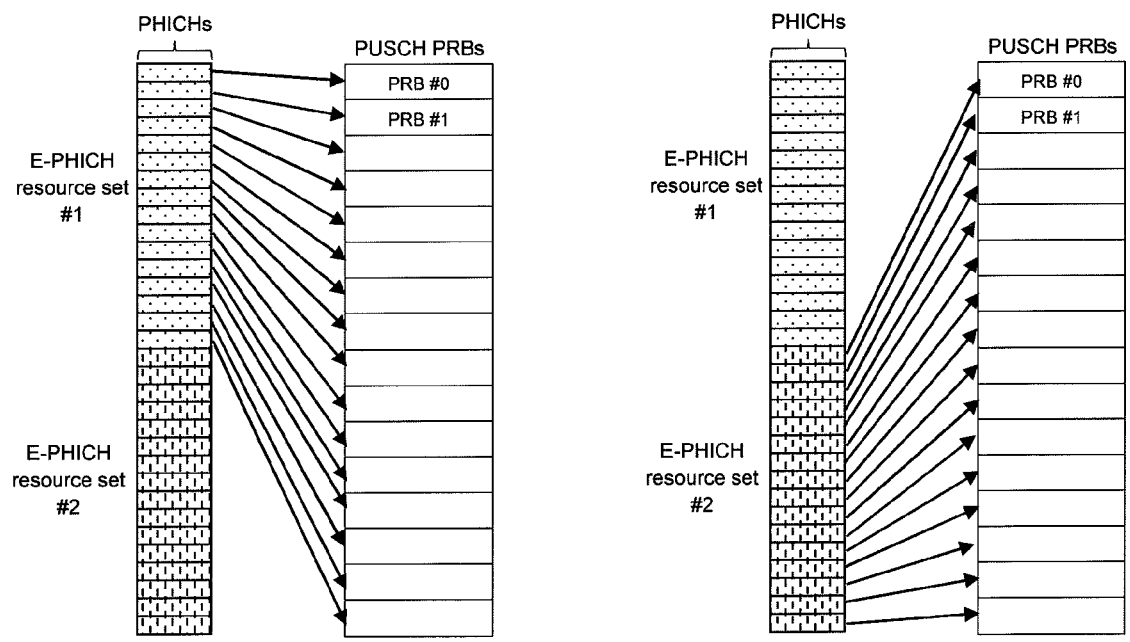
FIG. 13 is a diagram of E-PHICH resource mapping, according to an embodiment of the disclosure.

As mentioned previously, a second set of embodiments deals with resource allocation for the E-PHICH. In existing LTE systems, one PHICH resource set is defined in a cell, and a PHICH resource (i.e., an index pair of a PHICH group and orthogonal sequence index in the group) is implicitly mapped to the starting index of the PRBs of a scheduled PUSCH. In an embodiment, multiple PHICH/E-PHICH resource sets are provided to increase PHICH capacity, while efficiently utilizing E-PHICH resources. An E-PHICH resource set is a collection of E-PHICH resources, where each E-PHICH resource is capable of carrying one E-PHICH that corresponds to a previous PUSCH transmission. The individual resource in the resource set is specified by a resource index. One example of a resource index is the index pair $(n_{PHICH}^{group}, n_{PHICH}^{seq})$ where $n_{PHICH}^{group}$ is the PHICH group number and $n_{PHICH}^{seq}$ is the orthogonal sequence index within the group. E-PHICH resources within a set can be mapped to all PUSCH PRB indices. FIG. 13 shows E-PHICH resources mapping to PUSCH PRBs logically. In this figure, it is assumed that the number of PHICHs in an E-PHICH resource set is equal to the number of PUSCH PRBs. If the number of PHICHs in an E-PHICH resource set is smaller than the number of PUSCH PRBs, different DMRS cyclic shifts may be signaled to different PUSCHs in order to avoid collisions in the actual PHICH transmissions. As shown in FIG. 13, for one PUSCH PRB, two E-PHICHs can be mapped in E-PHICH resource set #1 and set #2.

Collisions between E-PHICH resources assigned to multiple UEs can happen when the number of E-PHICH resources is smaller than the number of PUSCH PRBs or when multiple UEs are allocated with the same PUSCH PRB, in the case of multiple-user multiple input/multiple output (MU-MIMO) for example. In such a case, different cyclic shifts may be signaled to avoid collision.

Multiple E-PHICH PRB resource sets may be useful in the scenario where multiple E-PHICHs are multiplexed with different types of E-PDCCH regions. For example, E-PHICH resource set 1 may be multiplexed with an E-PDCCH configured with localized transmission, while E-PHICH resource set 2 may be multiplexed with an E-PDCCH configured with distributed transmission. In this case, if a UE is configured to monitor the localized E-PDCCH region, the UE may need to monitor and receive the E-PHICH in E-PHICH resource set 1 only when a PUSCH PRB is scheduled by an E-PDCCH localized transmission. Otherwise, if a UE is configured to monitor the distributed E-PDCCH region, the UE may need to monitor and receive the E-PHICH in E-PHICH resource set 2 only when a PUSCH PRB is scheduled by an E-PDCCH distributed transmission. This may reduce UE complexity by not receiving the E-PHICH over all E-PHICH resources.

Multiple E-PHICH PRB resource sets may also be useful in the scenario where multiple reference signal structures or transmission schemes may be required. For example, when multiple RRHs are configured with the same cell ID and E-PHICHs are transmitted in different RRHs with different reference signals, it may be desirable to receive the E-PHICH from an RRH suitable for the UE. In this case, a separate E-PHICH resource set may be configured for each RRH.

Multiple E-PHICH PRB resource sets may also be useful in the scenario where saving the resources reserved for the E-PHICH may be required. Although an E-PHICH resource may be mapped to a PUSCH PRB index, the same amount of E-PHICH resources as the number of PUSCH PRBs may not be required because multiple PRBs can be scheduled to one UE. In Rel-8, the amount of PHICH resources is configured with the PBCH, and hence may be difficult to change, depending on the number of actually required PHICH resources. If the E-PHICH resource set is dynamically indicated in the uplink grant, it may be possible to reduce the resources reserved for the E-PHICH by assigning the E-PHICH to a certain E-PHICH group only. Therefore, depending on the number of UEs scheduled for PUSCH transmission, all E-PHICH transmissions may be limited to one E-PHICH resource set, and the remaining E-PHICH resource sets may be used for PDSCH transmissions.

Multiple E-PHICH resource sets may be assigned in different frequency, time or code sequence domains. In FIG. 13, two E-PHICH resource sets are configured, and the E-PHICH in each set is mapped to a PUSCH PRB.

It is not necessarily required to reserve twice the amount of the E-PHICH resources and map the resources to PUSCH PRBs in each E-PHICH resource set, because multiple PUSCH PRBs may be allocated to one UE and only one or two PHICH resources may be required to transmit one or two HARQ ACKs.

The actually used E-PHICH resource set may be either semi-statically configured or dynamically indicated by including E-PHICH resource set information explicitly in an uplink grant. For example, if the maximum four E-PHICH resource sets are supported, two bits of information may be included to indicate which E-PHICH resource set is used. Alternatively, implicit indication is also possible, where the CCE or eCCE index of the E-PDCCH carrying the uplink grant may be used to derive the E-PHICH resource set. Let $\{S_0, S_1, \ldots, S_{M-1}\}$ be the M sets of E-PHICH resources and n be the lowest CCE or eCCE index of an E-PDCCH carrying an uplink grant for PUSCH transmission. Then, as an example, the E-PHICH resource set $S_k$ for the corresponding E-PHICH can be implicitly derived using the following equation (3).

$$k = n \bmod M \tag{3}$$

Once the E-PHICH resource set is determined, the existing PHICH equation may be reused to calculate the E-PHICH group and orthogonal sequence index pair within each E-PHICH resource set. In this case, $n_{PHICH}^{group}$ may be the number of PHICH groups in the corresponding E-PHICH resource set.

As mentioned previously, a third set of embodiments deals with monitoring and receiving the PHICH and the E-PHICH. If both legacy control regions and the E-PHICH are supported and configured, an advanced UE may monitor and receive both the PHICH and the E-PHICH. If an advanced UE is configured to receive both the PDCCH and the E-PDCCH, the UE may also be able to receive both the PHICH and the E-PHICH. In this case, all PHICH and E-PHICH resources may be jointly mapped to a PUSCH PRB index. For a UE receiving both the PHICH and the E-PHICH, the equation for deriving a PHICH resource may need to be modified. For example, two parameters may be signaled for the number of groups for the PHICH ($N_{PHICH}^{group}$) and for the E-PHICH ($N_{E\text{-}PHICH}^{group}$), respectively. The PHICH group index may be calculated by:

$$n_{PHICH}^{group} = (I_{PRB\_RA}^{lowest\_index} + n_{DMRS}) \bmod (N_{PHICH}^{group} + N_{E\text{-}PHICH}^{group}) + I_{PHICH}(N_{PHICH}^{group} + N_{E\text{-}PHICH}^{group}) \tag{4}$$

$$n_{PHICH}^{seq} = (\lfloor I_{PRB\_RA}^{lowest\_index}/(N_{PHICH}^{group} + N_{E\text{-}PHICH}^{group})\rfloor + n_{DMRS}) \bmod 2N_{SF}^{PHICH} \tag{5}$$

In order to know whether the PHICH or the E-PHICH is used, the UE may compare the calculated $n_{PHICH}^{group}$ with $N_{PHICH}^{group}$. Specifically, the UE may know that the E-PHICH resource is used if $n_{PHICH}^{group}$ is larger than or equal to $N_{PHICH}^{group}$. As the number of groups for the PHICH ($N_{PHICH}^{group}$) is already indicated in the PBCH, the number for an E-PHICH group ($N_{E\text{-}PHICH}^{group}$) may be signaled in the PBCH using unused bits. Alternatively, the number for an E-PHICH group may be signaled by higher layer signaling.

Alternatively, a PHICH or E-PHCIH resource may be used depending on the PUSCH PRB index and whether a DMRS value meets certain criteria. For example, If $\lfloor(I_{PRB\_RA}^{lowest\_index}+n_{DMRS})/2N_{SF}^{PHICH}\rfloor > N_{PHICH}^{group}$, $n_{E\text{-}PHICH}^{group} = (I_{PRB\_RA}^{lowest\_index}+n_{DMRS}) \bmod N_{E\text{-}PHICH}^{group} + I_{PHICH}N_{E\text{-}PHICH}^{group}$ \hfill (6)

$$n_{E\text{-}PHICH}^{seq} = (\lfloor I_{PRB\_RA}^{lowest\_index}/N_{E\text{-}PHICH}^{group}\rfloor + n_{DMRS}) \bmod 2N_{SF}^{PHICH} \tag{7}$$

else $$n_{PHICH}^{group} = (I_{PRB\_RA}^{lowest\_index}+n_{DMRS}) \bmod N_{PHICH}^{group} + I_{PHICH}N_{PHICH}^{group} \tag{8}$$

$$n_{PHICH}^{seq} = (\lfloor I_{PRB\_RA}^{lowest\_index}/N_{PHICH}^{group}\rfloor + n_{DMRS}) \bmod 2N_{SF}^{PHICH} \tag{9}$$

Instead of jointly mapping the PHICH and E-PHICH resources, it is also possible that the PHICH may be used when an uplink DCI grant is transmitted on the PDCCH and that the E-PHICH may be used when an uplink DCI grant is transmitted on the E-PDCCH. In this case, the PHICH group index equation can be defined as follows.

If an uplink DCI grant is transmitted on a PDCCH, $$n_{PHICH}^{group} = (I_{PRB\_RA}^{lowest\_index}+n_{DMRS}) \bmod 2N_{PHICH}^{group} + I_{PHICH}N_{PHICH}^{group} \tag{10}$$

$$n_{PHICH}^{seq} = (\lfloor I_{PRB\_RA}^{lowest\_index}/N_{PHICH}^{group}\rfloor + n_{DMRS}) \bmod 2N_{SF}^{PHICH} \tag{11}$$

else if an uplink DCI grant is transmitted on an E-PDCCH, $$n_{E\text{-}PHICH}^{group} = (I_{PRB\_RA}^{lowest\_index}+n_{DMRS}) \bmod N_{E\text{-}PHICH}^{group} + I_{PHICH}N_{E\text{-}PHICH}^{group} \tag{12}$$

$$n_{E\text{-}PHICH}^{seq} = (\lfloor I_{PRB\_RA}^{lowest\_index}/N_{E\text{-}PHICH}^{group}\rfloor + n_{DMRS}) \bmod 2N_{SF}^{PHICH} \tag{13}$$

There are also cases where multiple E-PDCCH regions exist. For example, in coordinated multi-point (CoMP) scenario 4, each RRH is configured with a TP-specific E-PDCCH region. For such cases, it may be necessary to define a corresponding TP-specific E-PHICH. The TP ID may be used to define such TP-specific features.

Alternatively, an eNB may semi-statically configure whether the PHICH or the E-PHICH is used. If a UE (either advanced or legacy) is configured to decode the PHICH in the legacy PDCCH region, the UE may use the formulas as defined in Rel-10 to derive the E-PHICH group and sequence index:

$$n_{PHICH}^{group} = (I_{PRB\_RA}^{lowest\_index}+n_{DMRS}) \bmod N_{PHICH}^{group} + I_{PHICH}N_{PHICH}^{group} \tag{14}$$

$$n_{PHICH}^{seq} = (\lfloor I_{PRB\_RA}^{lowest\_index}/N_{PHICH}^{group}\rfloor + n_{DMRS}) \bmod 2N_{SF}^{PHICH} \tag{15}$$

If an advanced UE is configured to decode the E-PHICH, the UE may use the following formula to derive the E-PHICH group and sequence index as defined below:

$$n_{E\text{-}PHICH}^{group} = (I_{PRB\_RA}^{lowest\_index}+n_{DMRS}) \bmod N_{E\text{-}PHICH}^{group} + I_{PHICH}N_{E\text{-}PHICH}^{group} \tag{16}$$

$$n_{E\text{-}PHICH}^{seq} = (\lfloor I_{PRB\_RA}^{lowest\_index} / N_{PHICH}^{group} \rfloor + n_{DMRS}) \bmod 2N_{E\text{-}SF}^{PHICH} \quad (17)$$

where parameters for the E-PHICH, such as the number of the E-PHICH group $N_{E\text{-}PHICH}^{group}$ and the spreading length $N_{E\text{-}SF}^{PHICH}$, may be signaled to the UE through higher layer signaling or other means such as the PBCH. By doing this, the PHICH and E-PHICH configurations may be separated, which may ease implementation.

If a UE monitors only the E-PDCCH, complications may arise in enabling the UE to receive both the PHICH and the E-PHICH. In addition, the UE may not receive the PHICH correctly if interference is high in the legacy region. Therefore, the UE may receive the E-PHICH only when the UE is configured to monitor only the E-PDCCH. Alternatively, the eNB may perform configuration separately whether the UE receives the PHICH or not.

If a UE is configured to receive the E-PHICH, then the phich-config field carried in the MIB may be re-interpreted for E-PHICH resource configuration, as shown below.

```
PHICH-Config ::=    SEQUENCE {
    phich-Duration      ENUMERATED {normal, extended},
    phich-Resource      ENUMERATED {oneSixth, half, one, two}
}
```

Figure 14:
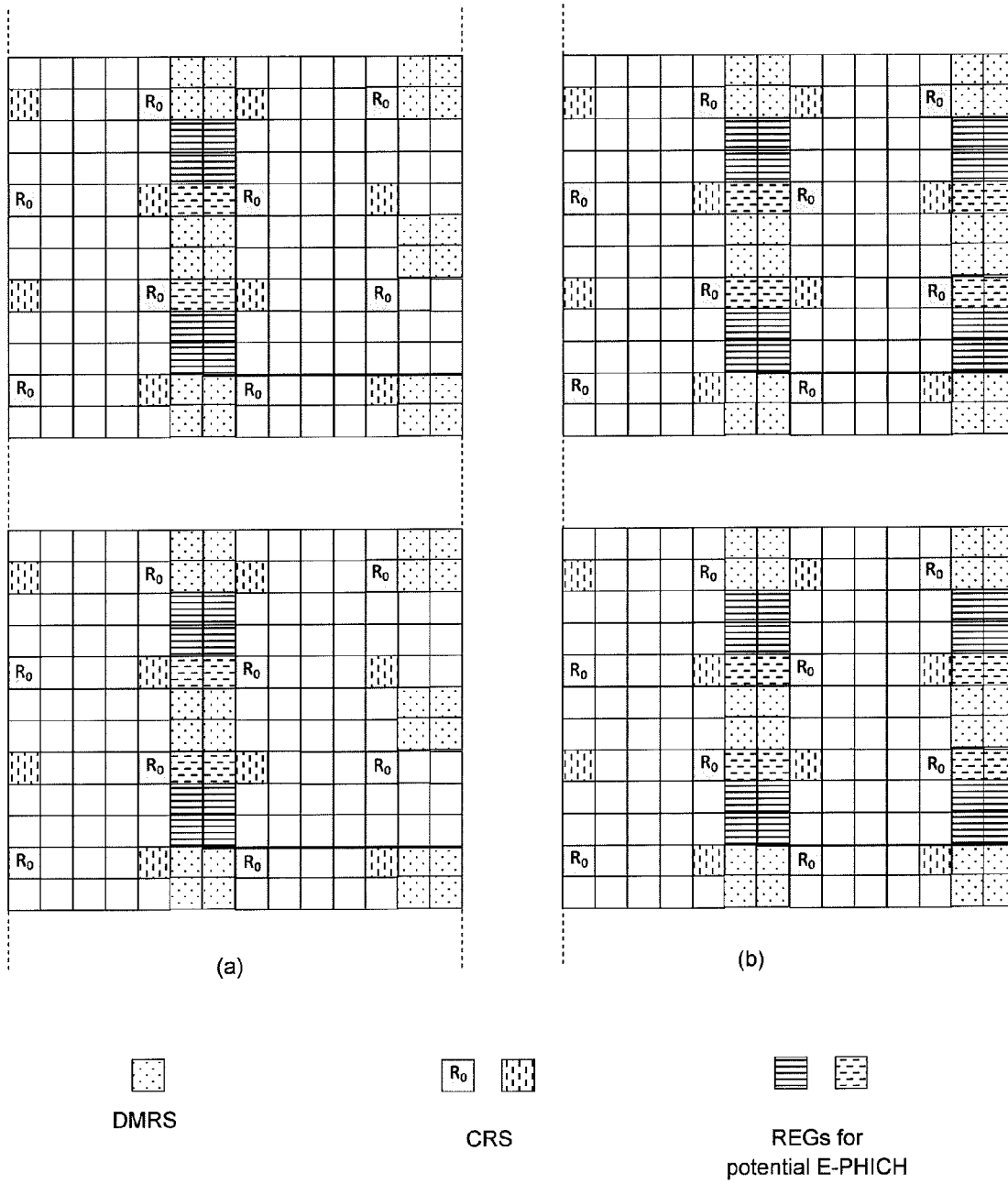
FIG. 14 is another diagram of E-PHICH resource mapping, according to an embodiment of the disclosure.

When 'phich-Duration' is equal to 'normal', then the E-PHICH may reside in the OFDM symbols carrying the DMRS and/or the REs close to the DMRS REs in the first slot only, as illustrated in FIG. 14(*a*). When 'phich-Duration' is equal to 'extended', then the E-PHICH may spread to the OFDM symbols carrying the DMRS and/or the REs close to the DMRS REs in the both the first and the second slot of a subframe, as illustrated in FIG. 14(*b*).

The 'phich-Resource' field can be used for calculating the number of E-PHICH groups as for the PHICH, resulting in the same amount of resources allocated for the E-PHICH and the PHICH. If it is desired to allocate more resources to the E-PHICH than the PHICH, then the value of 'phich-Resource' can be re-interpreted for the E-PHICH. This can happen, for example, when a large number of UEs need to be served while the PHICH is not available (e.g., if there is no legacy control region). For example, if 'ENUMERATED {oneSixth, half, one, two}' is re-interpreted by an advanced UE which corresponds to $N_g \in \{1/3, 1, 2, 4\}$, then the number of groups in the E-PHICH may be twice that of the PHICH.

Alternatively, the PBCH may still contain the information only for the PHICH. A UE may receive information about the PHICH from the PBCH and start to monitor and receive the PHICH first. The UE may be configured to monitor and receive the E-PHICH semi-statically through higher layer signaling. Such a configuration may be sent together or separately with the configuration of the E-PDCCH. After such a configuration is received, the UE may start to monitor and receive the E-PHICH.

As mentioned previously, a fourth set of embodiments deals with inter-cell interference management for the E-PHICH. The inter-cell interference coordination (ICIC) mechanism may be leveraged to achieve interference avoidance between the E-PHICHs of neighbor cells in the frequency domain. That is, two neighbor cells may transmit E-PHICHs over non-overlapping PRBs. This implies that the E-PHICH resource is keyed off an ICIC parameter. To coordinate between cells of two eNBs, a signal may be exchanged over the X2 interface between two neighbor cells, and the E-PHICH resource parameter may be signaled to the connected UEs via a system information block (SIB). The X2 signaling as defined in Rel-8 for ICIC may be reused to achieve this coordination after resources for E-PHICH transmission are allocated. Before such a parameter is received by the UE, the UE may monitor the PHICH only. For an RRH scenario, the X2 exchange may not be needed to coordinate two RRHs of the same eNB. Thus, the eNB scheduler may define such a PHICH resource parameter without any dependency on X2 signaling. The E-PHICH resource unit may be shifted based on cell ID, so that E-PHICHs from different cells do not collide. Such a shift could be REG-based or PRB-based.

While interference avoidance may be desirable, interference randomization in the design of the E-PHICH may still be needed for one or more reasons. First, the neighbor cells may not always choose to coordinate (e.g., two cells may belong to two different operators). Second, there may be a preparation period before the cells are coordinated. Third, full coordination may be difficult if the bandwidth is small and/or if coordination needs to be done between multiple cells. One example of providing interference randomization is a case where the REG resources for the E-PHICH vary as a function of the subframe number as well as the cell ID so that two cells would be likely to use different REGs in a given subframe.

At least two different scenarios may exist regarding inter-cell interference management for the E-PHICH. In a first scenario, a component carrier (CC) has a legacy control region on the downlink, and the associated uplink CC may or may not be cross-carrier scheduled. In this case, the UE may receive a downlink ACK/NACK via the PHICH only in the legacy control region, when the UE attaches initially. When the network directs the UE to receive an ACK/NACK via the E-PHICH only via UE-specific RRC signaling, the UE may switch to receive the E-PHICH only for all future subframes until further notice. The UE-specific RRC signaling may carry resource allocation information for the E-PHICH so that the UE can locate the E-PHICH directly for future subframes. Information carried on the UE-specific RRC signaling may include the PRB location of the E-PHICH, which takes into account the interference coordination between two neighboring cells or two neighboring RRHs. The same UE-specific RRC signaling may also trigger the UE to receive a downlink control channel via the E-PDCCH. When the network directs the UE to stop detecting the E-PHICH, then the UE may switch to receive the PHICH only for all future subframes until further notice.

In the second scenario, a component carrier, $CC_B$, that has no legacy control region on the downlink is associated with another component carrier, $CC_A$, that has a legacy control region. In this case, the UE may receive a downlink ACK/NACK via the PHICH only in the legacy control region of $CC_A$, when the UE attaches initially. When the network adds $CC_B$ to the UE as a secondary cell (SCell), the UE may start to receive all downlink control signals only on $CC_B$. This implies that the UE switches to receive the E-PHICH (and E-PDCCH) only on $CC_B$ for all future subframes until further notice. There may be no need to detect the PDCCH and the PHICH on $CC_B$ because the PDCCH and the PHICH are not transmitted on $CC_B$. The eNB may need to configure the E-PHICH (and E-PDCCH) on $CC_B$ before $CC_B$ is added as an SCell, as $CC_B$ may experience less interference from other cells or TPs. When the network removes $CC_B$ from the UE's SCell list, the UE may switch to receive downlink control channels only on $CC_A$ for all future subframes until further notice.

The embodiments disclosed herein provide a detailed multiplexing scheme for the E-PHICH and the E-PDCCH and/or PDSCH. Alternatively, the E-PHICH may be transmitted alone in some PRBs. Consequently, the embodiments can achieve efficient resource utilization for the E-PHICH given the characteristic of the E-PDCCH and/or PDSCH. The embodiments also provide efficient utilization of PHICH resources by using a concept of multiple PHICH resource sets. The embodiments further enable a UE to receive HARQ-ACK when both the PHICH and the E-PHICH are supported in an LTE eNB. In addition, the embodiments provide ICIC management for the E-PHICH that can avoid interference on the E-PHICH.

Figure 16:
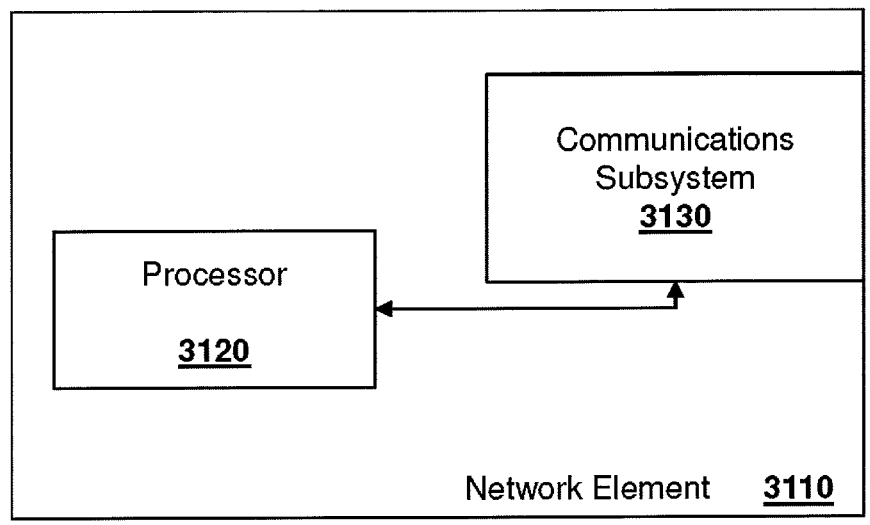
FIG. 16 is a simplified block diagram of an exemplary network element according to one embodiment.

The above may be implemented by a network element. A simplified network element is shown with regard to FIG. 16. In FIG. 16, network element 3110 includes a processor 3120 and a communications subsystem 3130, where the processor 3120 and communications subsystem 3130 cooperate to perform the methods described above.

Figure 17:
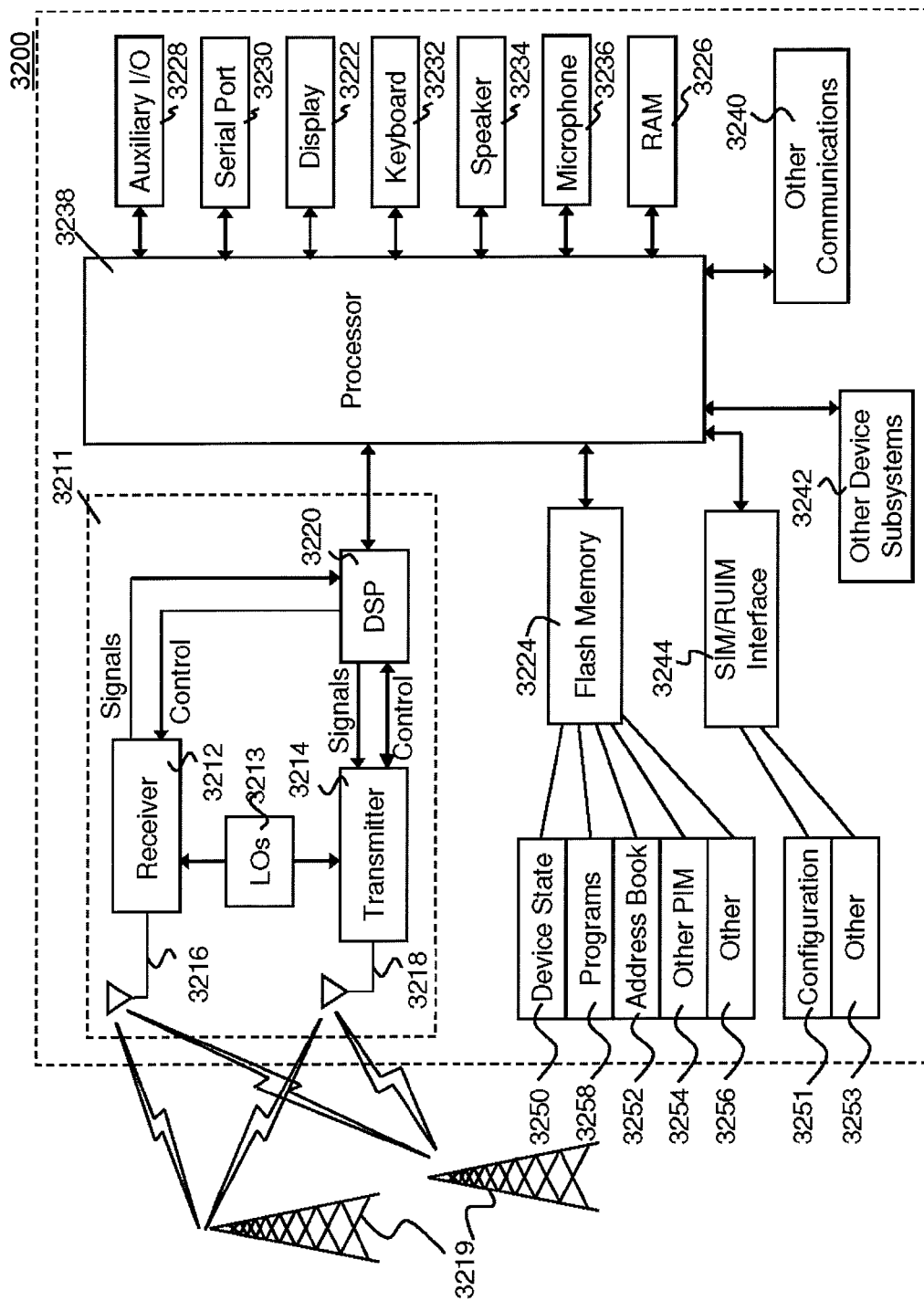
FIG. 17 is a block diagram with an example user equipment capable of being used with the systems and methods in the embodiments described herein.

Further, the above may be implemented by a UE. An example of a UE is described below with regard to FIG. 17. UE 3200 may comprise a two-way wireless communication device having voice and data communication capabilities. In some embodiments, voice communication capabilities are optional. The UE 3200 generally has the capability to communicate with other computer systems on the Internet. Depending on the exact functionality provided, the UE 3200 may be referred to as a data messaging device, a two-way pager, a wireless e-mail device, a cellular telephone with data messaging capabilities, a wireless Internet appliance, a wireless device, a smart phone, a mobile device, or a data communication device, as examples.

Where the UE 3200 is enabled for two-way communication, it may incorporate a communication subsystem 3211, including a receiver 3212 and a transmitter 3214, as well as associated components such as one or more antenna elements 3216 and 3218, local oscillators (LOs) 3213, and a processing module such as a digital signal processor (DSP) 3220. The particular design of the communication subsystem 3211 may be dependent upon the communication network in which the UE 3200 is intended to operate.

Network access requirements may also vary depending upon the type of network 3219. In some networks, network access is associated with a subscriber or user of the UE 3200. The UE 3200 may require a removable user identity module (RUIM) or a subscriber identity module (SIM) card in order to operate on a network. The SIM/RUIM interface 3244 is typically similar to a card slot into which a SIM/RUIM card may be inserted. The SIM/RUIM card may have memory and may hold many key configurations 3251 and other information 3253, such as identification and subscriber-related information.

When required network registration or activation procedures have been completed, the UE 3200 may send and receive communication signals over the network 3219. As illustrated, the network 3219 may consist of multiple base stations communicating with the UE 3200.

Signals received by antenna 3216 through communication network 3219 are input to receiver 3212, which may perform such common receiver functions as signal amplification, frequency down conversion, filtering, channel selection, and the like. Analog to digital (A/D) conversion of a received signal allows more complex communication functions, such as demodulation and decoding to be performed in the DSP 3220. In a similar manner, signals to be transmitted are processed, including modulation and encoding for example, by DSP 3220 and are input to transmitter 3214 for digital to analog (D/A) conversion, frequency up conversion, filtering, amplification, and transmission over the communication network 3219 via antenna 3218. DSP 3220 not only processes communication signals but also provides for receiver and transmitter control. For example, the gains applied to communication signals in receiver 3212 and transmitter 3214 may be adaptively controlled through automatic gain control algorithms implemented in DSP 3220.

The UE 3200 generally includes a processor 3238 which controls the overall operation of the device. Communication functions, including data and voice communications, are performed through communication subsystem 3211. Processor 3238 also interacts with further device subsystems such as the display 3222, flash memory 3224, random access memory (RAM) 3226, auxiliary input/output (I/O) subsystems 3228, serial port 3230, one or more keyboards or keypads 3232, speaker 3234, microphone 3236, other communication subsystem 3240 such as a short-range communications subsystem, and any other device subsystems generally designated as 3242. Serial port 3230 may include a USB port or other port currently known or developed in the future.

Some of the illustrated subsystems perform communication-related functions, whereas other subsystems may provide "resident" or on-device functions. Notably, some subsystems, such as keyboard 3232 and display 3222, for example, may be used for both communication-related functions, such as entering a text message for transmission over a communication network, and device-resident functions, such as a calculator or task list.

Operating system software used by the processor 3238 may be stored in a persistent store such as flash memory 3224, which may instead be a read-only memory (ROM) or similar storage element (not shown). The operating system, specific device applications, or parts thereof, may be temporarily loaded into a volatile memory such as RAM 3226. Received communication signals may also be stored in RAM 3226.

As shown, flash memory 3224 may be segregated into different areas for both computer programs 3258 and program data storage 3250, 3252, 3254 and 3256. These different storage types indicate that each program may allocate a portion of flash memory 3224 for their own data storage requirements. Processor 3238, in addition to its operating system functions, may enable execution of software applications on the UE 3200. A predetermined set of applications that control basic operations, including at least data and voice communication applications for example, may typically be installed on the UE 3200 during manufacturing. Other applications may be installed subsequently or dynamically.

Applications and software may be stored on any computer-readable storage medium. The computer-readable storage medium may be tangible or in a transitory/non-transitory medium such as optical (e.g., CD, DVD, etc.), magnetic (e.g., tape), or other memory currently known or developed in the future.

One software application may be a personal information manager (PIM) application having the ability to organize and manage data items relating to the user of the UE 3200 such as, but not limited to, e-mail, calendar events, voice mails, appointments, and task items. One or more memory stores may be available on the UE 3200 to facilitate storage of PIM data items. Such a PIM application may have the ability to send and receive data items via the wireless network 3219. Further applications may also be loaded onto the UE 3200 through the network 3219, an auxiliary I/O subsystem 3228, serial port 3230, short-range communications subsystem 3240, or any other suitable subsystem 3242, and installed by a user in the RAM 3226 or a non-volatile store (not shown) for execution by the processor 3238. Such flexibility in application installation may increase the functionality of the UE 3200 and may provide enhanced on-device functions, communication-related functions, or both. For example, secure communication applications may enable electronic commerce functions and other such financial transactions to be performed using the UE 3200.

In a data communication mode, a received signal such as a text message or web page download may be processed by the communication subsystem 3211 and input to the processor 3238, which may further process the received signal for output to the display 3222, or alternatively to an auxiliary I/O device 3228.

A user of the UE 3200 may also compose data items, such as email messages for example, using the keyboard 3232, which may be a complete alphanumeric keyboard or telephone-type keypad, among others, in conjunction with the display 3222 and possibly an auxiliary I/O device 3228. Such composed items may then be transmitted over a communication network through the communication subsystem 3211.

For voice communications, overall operation of the UE 3200 is similar, except that received signals may typically be output to a speaker 3234 and signals for transmission may be generated by a microphone 3236. Alternative voice or audio I/O subsystems, such as a voice message recording subsystem, may also be implemented on the UE 3200. Although voice or audio signal output may be accomplished primarily through the speaker 3234, display 3222 may also be used to provide an indication of the identity of a calling party, the duration of a voice call, or other voice call-related information, for example.

Serial port 3230 may be implemented in a personal digital assistant (PDA)-type device for which synchronization with a user's desktop computer (not shown) may be desirable, but such a port is an optional device component. Such a port 3230 may enable a user to set preferences through an external device or software application and may extend the capabilities of the UE 3200 by providing for information or software downloads to the UE 3200 other than through a wireless communication network. The alternate download path may, for example, be used to load an encryption key onto the UE 3200 through a direct and thus reliable and trusted connection to thereby enable secure device communication. Serial port 3230 may further be used to connect the device to a computer to act as a modem.

Other communications subsystems 3240, such as a short-range communications subsystem, are further optional components which may provide for communication between the UE 3200 and different systems or devices, which need not necessarily be similar devices. For example, the subsystem 3240 may include an infrared device and associated circuits and components or a Bluetooth™ communication module to provide for communication with similarly enabled systems and devices. Subsystem 3240 may further include non-cellular communications such as WiFi, WiMAX, near field communication (NFC), and/or radio frequency identification (RFID). The other communications element 3240 may also be used to communicate with auxiliary devices such as tablet displays, keyboards or projectors.

Figure 18:
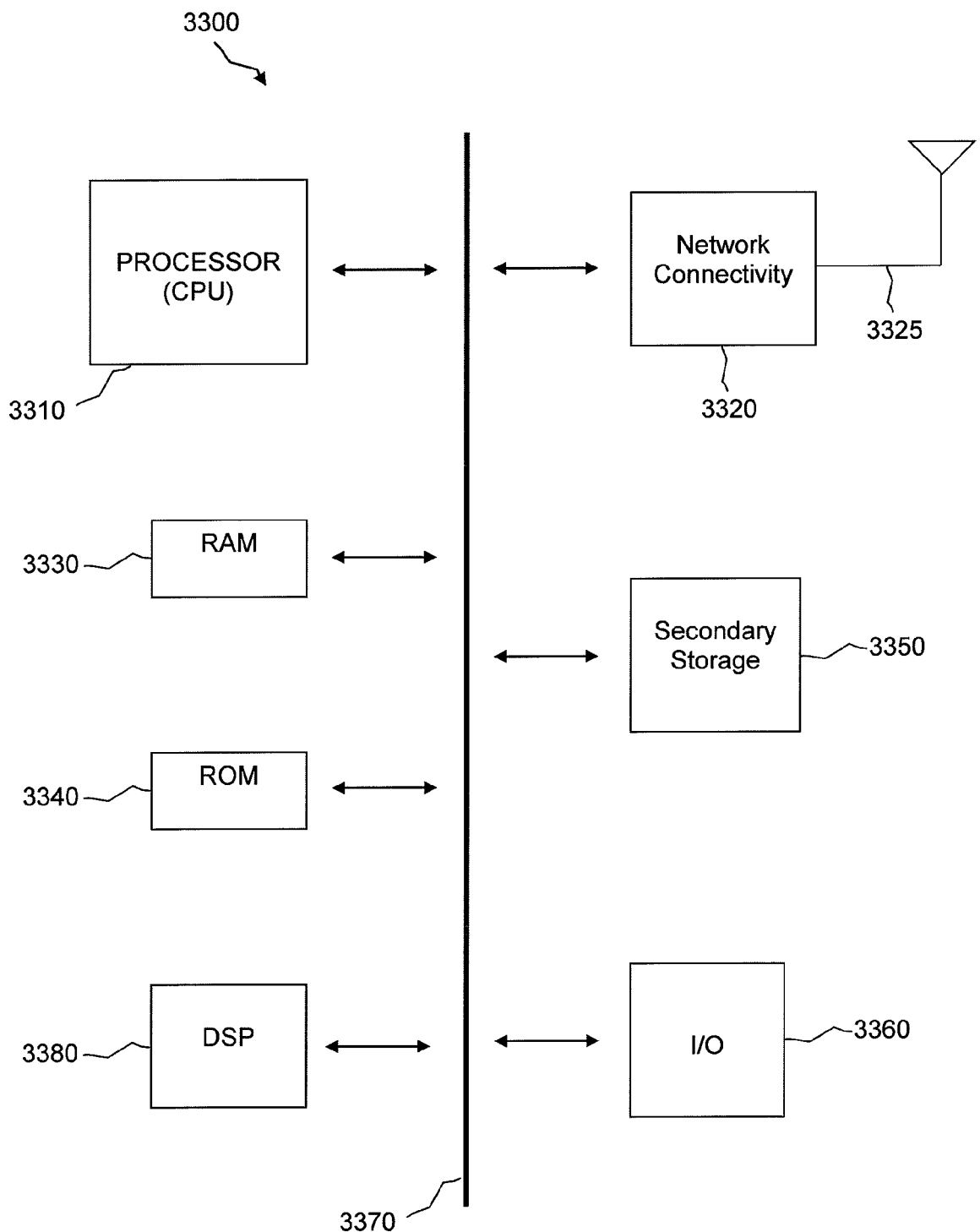
FIG. 18 illustrates a processor and related components suitable for implementing the several embodiments of the present disclosure.

The UE and other components described above might include a processing component that is capable of executing instructions related to the actions described above. FIG. 18 illustrates an example of a system 3300 that includes a processing component 3310 suitable for implementing one or more embodiments disclosed herein. In addition to the processor 3310 (which may be referred to as a central processor unit or CPU), the system 3300 might include network connectivity devices 3320, random access memory (RAM) 3330, read only memory (ROM) 3340, secondary storage 3350, and input/output (I/O) devices 3360. These components might communicate with one another via a bus 3370. In some cases, some of these components may not be present or may be combined in various combinations with one another or with other components not shown. These components might be located in a single physical entity or in more than one physical entity. Any actions described herein as being taken by the processor 3310 might be taken by the processor 3310 alone or by the processor 3310 in conjunction with one or more components shown or not shown in the drawing, such as a digital signal processor (DSP) 3380. Although the DSP 3380 is shown as a separate component, the DSP 3380 might be incorporated into the processor 3310.

The processor 3310 executes instructions, codes, computer programs, or scripts that it might access from the network connectivity devices 3320, RAM 3330, ROM 3340, or secondary storage 3350 (which might include various disk-based systems such as hard disk, floppy disk, or optical disk). While only one CPU 3310 is shown, multiple processors may be present. Thus, while instructions may be discussed as being executed by a processor, the instructions may be executed simultaneously, serially, or otherwise by one or multiple processors. The processor 3310 may be implemented as one or more CPU chips.

The network connectivity devices 3320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, worldwide interoperability for microwave access (WiMAX) devices, and/or other well-known devices for connecting to networks. These network connectivity devices 3320 may enable the processor 3310 to communicate with the Internet or one or more telecommunications networks or other networks from which the processor 3310 might receive information or to which the processor 3310 might output information. The network connectivity devices 3320 might also include one or more transceiver components 3325 capable of transmitting and/or receiving data wirelessly.

The RAM 3330 might be used to store volatile data and perhaps to store instructions that are executed by the processor 3310. The ROM 3340 is a non-volatile memory device that typically has a smaller memory capacity than the memory capacity of the secondary storage 3350. ROM 3340 might be used to store instructions and perhaps data that are read during execution of the instructions. Access to both RAM 3330 and ROM 3340 is typically faster than to secondary storage 3350. The secondary storage 3350 is typically comprised of one or more disk drives or tape drives and might be used for non-volatile storage of data or as an over-flow data storage device if RAM 3330 is not large enough to hold all working data. Secondary storage 3350 may be used to store programs that are loaded into RAM 3330 when such programs are selected for execution.

The I/O devices 3360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 3325 might be considered to be a component of the I/O devices 3360 instead of or in addition to being a component of the network connectivity devices 3320.

The following are incorporated herein by reference for all purposes: 3GPP TS 36.211, 3GPP TS 36.212, and 3GPP TS 36.213.

In an embodiment, a method for communication in a wireless telecommunication system is provided. The method comprises generating, by a network element, a sequence of signals of an E-PHICH. The method further comprises mapping, by the network element, the sequence of signals of the E-PHICH to a first set of resource elements, wherein the first set of resource elements is multiplexed with a second set of resource elements over a set of virtual resource blocks, and wherein the second set of resource elements carries at least one of an E-PDCCH and a PDSCH.

In another embodiment, a network element is provided. The network element comprises a processor configured such that the network element generates a sequence of signals of an E-PHICH. The processor is further configured such that the network element maps the sequence of signals of the E-PHICH to a first set of resource elements, wherein the first set of resource elements is multiplexed with a second set of resource elements over a set of virtual resource blocks, and wherein the second set of resource elements carries at least one of an E-PDCCH and a PDSCH.

In another embodiment, a UE is provided. The UE comprises a processor configured such that the UE receives a sequence of signals of an E-PHICH, wherein the sequence of signals has been mapped to a first set of resource elements, and wherein the first set of resource elements has been multiplexed with a second set of resource elements over a set of virtual resource blocks, and wherein the second set of resource elements carries at least one of an E-PDCCH and a PDSCH.

In another embodiment, a method for communication in a wireless telecommunication system is provided. The method comprises providing, by a network element, one or more E-PHICH resource sets, wherein an E-PHICH resource set contains a plurality of E-PHICH resources, and wherein an index of an E-PHICH resource used in transmitting an E-PHICH is related to a parameter associated with a PUSCH.

In another embodiment, a network element is provided. The network element comprises a processor configured such that the network element provides one or more E-PHICH resource sets, wherein an E-PHICH resource set contains a plurality of E-PHICH resources, and wherein an index of an E-PHICH resource used in transmitting an E-PHICH is related to a parameter associated with a PUSCH.

In another embodiment, a method for communication in a wireless telecommunication system is provided. The method comprises monitoring, by a UE, both a PHICH and an E-PHICH transmitted by a network element, wherein a resource index of the E-PHICH is related to a parameter of a PUSCH.

In another embodiment, a UE is provided. The UE comprises a processor configured such that the UE monitors both a PHICH and an E-PHICH transmitted by a network element, wherein a resource index of the E-PHICH is related to a parameter of a PUSCH.

In another embodiment, a method for communication in a wireless telecommunication system is provided. The method comprises sending, by a first network element, to a second network element, a message on the mapping of a resource set of a first E-PHICH to physical resources. The method further comprises transmitting, by the first network element, to a UE, the first E-PHICH.

In another embodiment, a network element is provided. The network element comprises a processor configured such that the network element transmits a first E-PHICH. The processor is further configured such that the network element coordinates with another network element in mapping to physical resources a resource set of the first E-PHICH and a resource set of a second E-PHICH transmitted by the other network element.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for communication in a wireless telecommunication system, the method comprising:
    generating, by a network element, a sequence of signals of an enhanced physical HARQ (hybrid automatic repeat request) indicator channel (E-PHICH);
    mapping, by the network element, the sequence of signals of the E-PHICH to a first set of resource elements, wherein the first set of resource elements is multiplexed with a second set of resource elements over a set of virtual resource blocks, and wherein the second set of resource elements carries at least one of an enhanced physical downlink control channel (E-PDCCH) and a physical downlink shared channel (PDSCH); and
    transmitting the sequence of E-PHICH signals in separate virtual resource blocks than the E-PDCCH, wherein the separate virtual resource blocks are mapped to physical resource blocks such that each physical resource block carrying E-PHICH signals is different than each physical resource block carrying E-PDCCH.

2. The method of claim 1, wherein the second set of resource elements carries an E-PDCCH configured with localized transmission such that the E-PDCCH is transmitted in at least one virtual resource block, wherein the at least one virtual resource block is not used to transmit other E-PDCCHs.

3. The method of claim 1, wherein the second set of resource elements carries an E-PDCCH configured with distributed transmission.

4. The method of claim 1, wherein the first set of resource elements belongs to resource blocks where commonly monitored E-PDCCHs are transmitted.

5. The method of claim 1, wherein a location of the set of virtual resource blocks is predefined.

6. The method of claim 1, wherein, when the second set of resource elements carries the PDSCH, the E-PHICH is mapped to a first group of resource elements that would otherwise be used for PDSCH transmission.

7. The method of claim 6, wherein PDSCH data is punctured at locations of the first group of resource elements.

8. The method of claim 6, wherein rate matching is applied to the PDSCH in generating signals of the PDSCH.

9. The method of claim 1, wherein the set of virtual resource blocks (VRBs) is of localized type mapped to a set of physical resource blocks (PRBs) such that each VRB in the set of VRBs corresponds to a PRB in the set of PRBs.

10. The method of claim 1, wherein the set of virtual resource blocks is of distributed type.

11. The method of claim 1, wherein frequency hopping is applied between a first virtual resource block in a first slot of a subframe and a second virtual resource block in a second slot of the subframe such that the first and second virtual resource blocks are transmitted at different frequencies in the first and second slots of the subframe, wherein the first and second virtual resource blocks only carry E-PHICHs when the subframe is transmitted.

12. The method of claim 1, wherein a parameter of the set of virtual resource blocks is signaled to provide resource indication of a plurality of downlink control channels.

13. The method of claim 1, wherein transmit diversity is applied in generating the sequence of signals of the E-PHICH.

14. The method of claim 1, wherein a location of the set of virtual resource blocks is linked to a parameter specific to a transmission point.

15. A network element comprising:
   a processor configured such that the network element:
   generates a sequence of signals of an enhanced physical HARQ (hybrid automatic repeat request) indicator channel (E-PHICH);
   maps the sequence of signals of the E-PHICH to a first set of resource elements, wherein the first set of resource elements is multiplexed with a second set of resource elements over a set of virtual resource blocks, and wherein the second set of resource elements carries at least one of an enhanced physical downlink control channel (E-PDCCH) and a physical downlink shared channel (PDSCH); and
   transmits the sequence of E-PHICH signals in separate virtual resource blocks than the E-PDCCH, wherein the separate virtual resource blocks are mapped to physical resource blocks such that each physical resource block carrying E-PHICH signals is different than each physical resource block carrying E-PDCCH.

16. The network element of claim 15, wherein the second set of resource elements carries an E-PDCCH configured with localized transmission such that the E-PDCCH is transmitted in at least one virtual resource block, wherein the at least one virtual resource block is not used to transmit other E-PDCCHs.

17. The network element of claim 15, wherein the second set of resource elements carries an E-PDCCH configured with distributed transmission.

18. The network element of claim 15, wherein the first set of resource elements belongs to resource blocks where commonly monitored E-PDCCHs are transmitted.

19. The network element of claim 15, wherein a location of the set of virtual resource blocks is predefined.

20. The network element of claim 15, wherein, when the second set of resource elements carries the PDSCH, the E-PHICH is mapped to a first group of resource elements that would otherwise be used for PDSCH transmission.

21. The network element of claim 20, wherein PDSCH data is punctured at locations of the first group of resource elements.

22. The network element of claim 20, wherein rate matching is applied to the PDSCH in generating signals of the PDSCH.

23. The network element of claim 15, wherein the set of virtual resource blocks (VRBs) is of localized type mapped to a set of physical resource blocks (PRBs) such that each VRB in the set of VRBs corresponds to a PRB in the set of PRBs.

24. The network element of claim 15, wherein the set of virtual resource blocks is of distributed type.

25. The network element of claim 15, wherein frequency hopping is applied between a first virtual resource block in a first slot of a subframe and a second virtual resource block in a second slot of the subframe such that the first and second virtual resource blocks are transmitted at different frequencies in the first and second slots of the subframe, wherein the first and second virtual resource blocks only carry E-PHICHs when the subframe is transmitted.

26. The network element of claim 15, wherein a parameter of the set of virtual resource blocks is signaled to provide resource indication of a plurality of downlink control channels.

27. The network element of claim 15, wherein transmit diversity is applied in generating the sequence of signals of the E-PHICH.

28. The network element of claim 15, wherein a location of the set of virtual resource blocks is linked to a parameter specific to a transmission point.

29. A user equipment (UE) comprising:
   a processor configured such that the UE receives a sequence of signals of an enhanced physical HARQ (hybrid automatic repeat request) indicator channel (E-PHICH), wherein the sequence of signals has been mapped to a first set of resource elements, and wherein the first set of resource elements has been multiplexed with a second set of resource elements over a set of virtual resource blocks, and wherein the second set of resource elements carries at least one of an enhanced physical downlink control channel (E-PDCCH) and a physical downlink shared channel (PDSCH),
   the processor further configured such that the UE receives the sequence of E-PHICH signals in separate virtual resource blocks than the E-PDCCH, wherein the separate virtual resource blocks are mapped to physical resource blocks such that each physical resource block carrying E-PHICH signals is different than each physical resource block carrying E-PDCCH.

30. The UE of claim 29, wherein the second set of resource elements carries an E-PDCCH configured with localized transmission such that the E-PDCCH is transmitted in at least one virtual resource block, wherein the at least one virtual resource block is not used to transmit other E-PDCCHs.

31. The UE of claim 29, wherein the second set of resource elements carries an E-PDCCH configured with distributed transmission.

32. The UE of claim 29, wherein the first set of resource elements belongs to resource blocks where commonly monitored E-PDCCHs are transmitted.

33. The UE of claim 29, wherein a location of the set of virtual resource blocks is predefined.

34. The UE of claim 29, wherein, when the second set of resource elements carries the PDSCH, the E-PHICH is mapped to a first group of resource elements that would otherwise be used for PDSCH transmission.

35. The UE of claim 34, wherein rate matching is applied to the PDSCH in receiving signals of the PDSCH.

36. The UE of claim 29, wherein the set of virtual resource blocks (VRBs) is of localized type mapped to a set of physical resource blocks (PRBs) such that each VRB in the set of VRBs corresponds to a PRB in the set of PRBs.

37. The UE of claim 29, wherein the set of virtual resource blocks is of distributed type.

38. The UE of claim 29, wherein frequency hopping is applied between a first virtual resource block in a first slot of a subframe and a second virtual resource block in a second slot of the subframe such that the first and second virtual resource blocks are transmitted at different frequencies in the first and second slots of the subframe, wherein the first and second virtual resource blocks only carry E-PHICHs when the subframe is transmitted.

39. The UE of claim 29, wherein a parameter of the set of virtual resource blocks is signaled to provide resource indication of a plurality of downlink control channels.

40. The UE of claim 29, wherein transmit diversity is assumed in receiving the sequence of signals of the E-PHICH.

41. The UE of claim 29, wherein a location of the set of virtual resource blocks is linked to a parameter specific to a transmission point.

42. The UE of claim 29, wherein the UE decodes the E-PHICH signals using a transmission point-specific reference signal.

43. The UE of claim 29, wherein the UE decodes the E-PHICH signals using a non-precoded demodulation reference signal.

* * * * *